(12) United States Patent
Tsubaki et al.

(10) Patent No.: US 10,526,010 B2
(45) Date of Patent: Jan. 7, 2020

(54) ELECTRIC POWER STEERING APPARATUS

(71) Applicant: NSK LTD., Tokyo (JP)

(72) Inventors: Takahiro Tsubaki, Maebashi (JP);
Haruhiko Kamiguchi, Maebashi (JP);
Tomohiro Miura, Maebashi (JP);
Nobuaki Kogure, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/063,428

(22) PCT Filed: Nov. 8, 2017

(86) PCT No.: PCT/JP2017/040269
§ 371 (c)(1),
(2) Date: Jun. 18, 2018

(87) PCT Pub. No.: WO2018/088433
PCT Pub. Date: May 17, 2018

(65) Prior Publication Data
US 2019/0337559 A1    Nov. 7, 2019

(30) Foreign Application Priority Data
Nov. 11, 2016   (JP) ................... 2016-220705

(51) Int. Cl.
*B62D 5/04*          (2006.01)
*H02H 7/08*          (2006.01)
(Continued)

(52) U.S. Cl.
CPC ......... *B62D 5/0496* (2013.01); *B62D 5/0409* (2013.01); *H02P 21/16* (2016.02); *H02P 21/22* (2016.02); *B62D 5/046* (2013.01)

(58) Field of Classification Search
CPC .......... B62D 5/0496; B62D 5/04; H02H 7/08
See application file for complete search history.

(56) References Cited

U.S. PATENT DOCUMENTS

2012/0313462 A1   12/2012  Hartmann et al.
2014/0195119 A1*   7/2014  Kouichi ............... B62D 5/0469
                                                            701/41

FOREIGN PATENT DOCUMENTS

DE    10 2011 103 797 A1    12/2012
EP        3 446 947 A1       2/2019
(Continued)

OTHER PUBLICATIONS

Written Opinion of the International Searching Authority of PCT/JP2017/040269 dated Feb. 13, 2018.
(Continued)

*Primary Examiner* — Kawing Chan
*Assistant Examiner* — Cortez M Cook
(74) *Attorney, Agent, or Firm* — Sughrue Mion, PLLC

(57) ABSTRACT

An electric power steering apparatus includes a control substrate that controls a poly-phase motor having a multi-system motor winding, including a temperature sensor that detects a substrate temperature of said control substrate; and a coil temperature estimating section that obtains coil calorific values of respective phases of said poly-phase motor and a substrate calorific value of said control substrate by a motor current of said phase, and estimates a coil temperature of said phase by said coil calorific value, said substrate calorific value and said substrate temperature based on a heat transfer phenomenon between said respective phases that is caused by a difference in temperature between coils of said respective phases and a heat transfer phenomenon between said coil and said control substrate.

12 Claims, 14 Drawing Sheets

(51) Int. Cl.
　　　*H02P 21/22*　　　(2016.01)
　　　*H02P 21/16*　　　(2016.01)

(56) References Cited

FOREIGN PATENT DOCUMENTS

| JP | 2006-042466 A | 2/2006 |
| JP | 2009-089531 A | 4/2009 |
| JP | 4483298 B2 | 6/2010 |
| JP | 2012-046049 A | 3/2012 |
| JP | 5211618 B2 | 6/2013 |

OTHER PUBLICATIONS

International Search Report of PCT/JP2017/040269 dated Feb. 13, 2018.

* cited by examiner

PRIOR ART

PRIOR ART

PRIOR ART

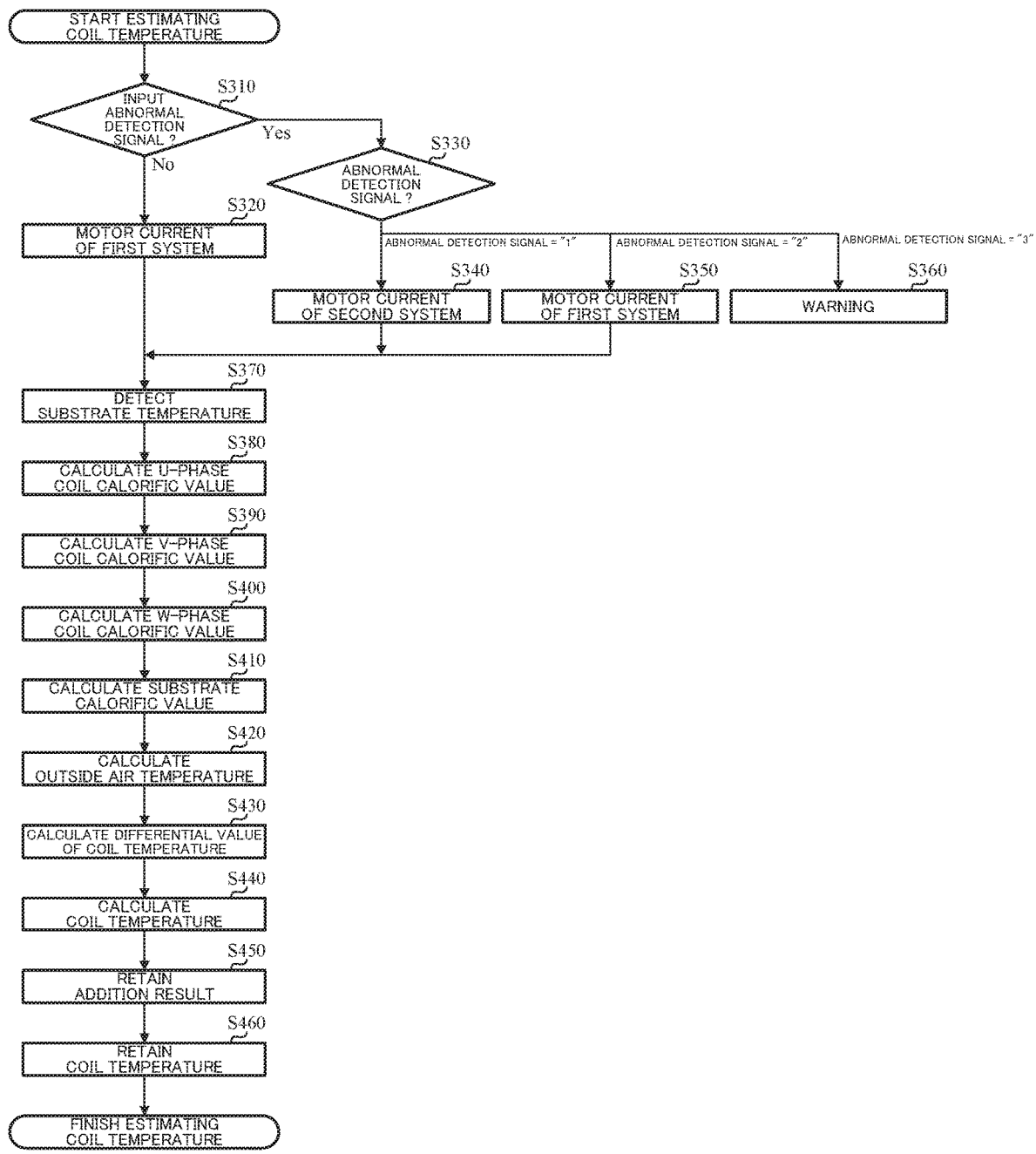

ELECTRIC POWER STEERING APPARATUS

CROSS REFERENCE TO RELATED APPLICATIONS

This application is a National Stage of International Application No. PCT/JP2017/040269 filed Nov. 8, 2017, claiming priority based on Japanese Patent Application No. 2016-220705 filed Nov. 11, 2016.

TECHNICAL FIELD

The present invention relates to an electric power steering apparatus that has a function to estimate a coil temperature of a poly-phase motor having a multi-system motor winding, and in particular to an electric power steering apparatus that estimates a coil temperature considering a heat transfer phenomenon between respective phases which is caused by a difference in temperature between coils of respective phases and a heat transfer phenomenon between the coil and a control substrate, and is capable of estimating the coil temperature even when an abnormality occurs in any of the systems.

BACKGROUND ART

An electric power steering apparatus (EPS) which provides a steering system of a vehicle with a steering assist torque (an assist torque) by means of a rotational torque of a motor, applies a motor driving force as the steering assist torque to a steering shaft or a rack shaft by means of a transmission mechanism such as gears or a belt through a reduction mechanism, and performs assist control. In order to accurately generate the assist torque, such a conventional electric power steering apparatus performs feedback control of a motor current. The feedback control adjusts a voltage supplied to the motor so that a difference between a steering assist command value (a current command value) and a detected motor current value becomes small, and the adjustment of the voltage supplied to the motor is generally performed by an adjustment of a duty ratio of pulse width modulation (PWM) control.

A general configuration of the conventional electric power steering apparatus will be described with reference to FIG. 1. As shown in FIG. 1, a column shaft (a steering shaft, a handle shaft) 2 connected to a steering wheel 1 is connected to steered wheels 8L and 8R through reduction gears (worm gears) 3 constituting the reduction mechanism, universal joints 4a and 4b, a rack and pinion mechanism 5, tie rods 6a and 6b, further via hub units 7a and 7b. In addition, a torsion bar is interposed in the column shaft 2, the column shaft 2 is provided with a steering angle sensor 14 for detecting a steering angel 6 of the steering wheel 1 in accordance with a twist angle of the torsion bar and a torque sensor 10 for detecting a steering torque Th, and a motor 20 for assisting the steering force of the steering wheel 1 is connected to the column shaft 2 through the reduction gears 3. Electric power is supplied to a control unit (ECU) 30 for controlling the electric power steering apparatus from a battery 13, and an ignition key signal is inputted into the control unit 30 through an ignition key 11. The control unit 30 calculates a current command value of an assist control command value based on the steering torque Th detected by the torque sensor 10 and a vehicle speed Vel detected by a vehicle speed sensor 12, and controls a current supplied to the motor 20 based on a voltage control command value Vref obtained by performing compensation and so on with respect to the current command value.

Further, the steering angle sensor 14 is not indispensable and may not be provided, and it is possible to obtain the steering angle from a rotational angle sensor such as a resolver connected to the motor 20.

A controller area network (CAN) 40 to exchanging various information of a vehicle is connected to the control unit 30, and it is also possible to receive the vehicle speed Vel from the CAN 40. Further, it is also possible to connect a non-CAN 41 exchanging a communication, analog/digital signals, a radio wave or the like except with the CAN 40 to the control unit 30.

The control unit 30 mainly comprises a CPU (including an MPU, an MCU and so on), and general functions performed by programs within the CPU are shown in FIG. 2.

The control unit 30 will be described with reference to FIG. 2. As shown in FIG. 2, the steering torque Th detected by the torque sensor 10 and the vehicle speed Vel detected by the vehicle speed sensor 12 (or from the CAN 40) are inputted into a current command value calculating section 31 that calculates a current command value Iref1. The current command value calculating section 31 calculates the current command value Iref1 that is a control target value of a current supplied to the motor 20 based on the steering torque Th and the vehicle speed Vel that have been inputted and by means of an assist map or the like. The current command value Iref1 is inputted into a current limiting section 33 through an adding section 32A. A current command value Irefm the maximum current of which is limited is inputted into a subtracting section 32B, and a deviation I (=Irefm−Im) between the current command value Irefm and a motor current value Im being fed back is calculated. The deviation I is inputted into a proportional integral (PI) control section 35 for improving a characteristic of the steering operation. The voltage control command value Vref whose characteristic is improved by the PI-control section 35 is inputted into a PWM-control section 36. Furthermore, the motor 20 is PWM-driven through an inverter 37. The motor current Im of the motor 20 is detected by a motor current detector 38 and is fed back to the subtracting section 32B. The inverter 37 is comprised of a bridge circuit of field effect transistors (FETs) as semiconductor switching elements.

A rotational angle sensor 21 such as a resolver is connected to the motor 20, and a rotational angle θ is detected and outputted by the rotational angle sensor 21.

A compensation signal CM from a compensation signal generating section 34 is added to the adding section 32A, and a characteristic compensation of the steering system is performed by the addition of the compensation signal CM so as to improve a convergence, an inertia characteristic and so on. The compensation signal generating section 34 adds a self-aligning torque (SAT) 343 and an inertia 342 at an adding section 344, further adds the result of addition performed at the adding section 344 with a convergence 341 at an adding section 345, and then outputs the result of addition performed at the adding section 345 as the compensation signal CM.

In the case that the motor 20 is a three-phase brushless motor, details of the PWM-control section 36 and the inverter 37 have a configuration as shown in FIG. 3, and the PWM-control section 36 comprises a duty calculating section 36A that calculates PWM duty values D1 to D6 for three phases by using the voltage control command value Vref in accordance with a predetermined expression, and a gate driving section 36B that drives the gates of the FETs serving as driving elements by means of the PWM duty values D1 to D6 and turns the gates on or off with compensating a dead time. The inverter 37 is configured to three-phase bridges of FETs (FET1 to FET6) serving as semiconductor switching elements, and drives the motor 20 by the three-phase bridges of the FETs being made turned on or off by means of the PWM duty values D1 to D6. A motor relay 39 for supplying (ON) or interrupting (OFF) electric power is connected to a power supply line between the inverter 37 and the motor 20 by the phase.

In such an electric power steering apparatus, a large current can flow in a motor in accordance with a steering situation (for example, a case where a steering wheel keeps hitting an end and being locked for a long time in a static steering state). When a coil in the motor has a high temperature, for example, more than or equal to 180 degrees Celsius, a problem of damage of the coil or the like occurs. Therefore, it is necessary to take measures not to overheat the coil from the viewpoint of safety of a vehicle, and to do so, it is necessary to estimate or measure a temperature of the coil (a coil temperature). However, since it is difficult to measure the coil temperature directly, methods to estimate the coil temperature have been proposed.

For example, the publication of Japanese Patent No. 5211618 B2 (Patent Document 1) constructs a temperature estimation model considering a relationship between heat transfer phenomena between poly-phase coils and a motor rotational velocity, and a relationship between a radiation coefficient and the motor rotational velocity, and estimates the coil temperature. Specifically, Patent Document 1 identifies heat transfer coefficients between a coil of any phase in a poly-phase motor and open air environment and between any phase and another phase in accordance with a change of the motor rotational velocity, and estimates a temperature of a coil of each phase or a magnet in the motor by using a substrate temperature and a current (or current command value) of each phase. The publication of Japanese Patent No. 4483298 B2 (Patent Document 2) estimates a temperature of a motor coil by utilizing that a calorific value of a motor is proportional to an integrated value of a square value of a current passing through the motor coil and that a temperature change of the motor coil affected by radiation (refrigeration) of the motor coil has a relationship of a primary delay function in a practically applicable temperature range (−40 to 180 degrees Celsius). Specifically, Patent Document 2 estimates the temperature of the motor coil by averaging a value obtained by squaring and integrating a value of the current passing through the motor coil, and making the result pass the primary delay function twice.

The List of Prior Art Documents Patent Documents
Patent Document 1: Japanese Patent No. 5211618 B2
Patent Document 2: Japanese Patent No. 4483298 B2

SUMMARY OF THE INVENTION

Problems to be Solved by the Invention

However, though Patent Document 1 uses a temperature of an ECU as input data considering a heat transfer between respective phase coils, it does not consider a heat transfer between each phase coil and the ECU, so that there is a possibility that an error occurs in an estimated temperature by an influence from the ECU. Since Patent Document 2 does not especially consider the influence from the ECU, there is the possibility that the error occurs in the estimated temperature by the influence from the ECU more than an apparatus in Patent Document 1.

Further, cases where a motor having a multi-system motor winding is used have recently increased so as to continue a motor operation even if a failure (including an abnormality) of the motor occurs. For example, with respect to a motor having two-system motor windings, coils of a stator are separated into two systems (a U1-phase to a W1-phase and a U2-phase to a W2-phase), and even if the failure occurs in one system, it is possible to rotate a rotor of the other system and continue assist control. In such a case, it is desired to possible to continue estimation of the coil temperature as well as the assist control.

The present invention has been developed in view of the above-described circumstances, and an object of the present invention is to provide an electric power steering apparatus that enables more precise estimation of a coil temperature by considering a heat transfer phenomenon between a control substrate and a coil in addition to a heat transfer phenomenon between respective phases of a poly-phase coil for a poly-phase motor having a multi-system motor winding, and enables the estimation of the coil temperature even when an abnormality occurs in any of the systems.

Means for Solving the Problems

The present invention relates to an electric power steering apparatus that comprises a control substrate that controls a poly-phase motor having a multi-system motor winding, the above-described object of the present invention is achieved by that comprising: a temperature sensor that detects a substrate temperature of the control substrate; and a coil temperature estimating section that obtains coil calorific values of respective phases of the poly-phase motor and a substrate calorific value of the control substrate by a motor current of the phase, and estimates a coil temperature of the phase by the coil calorific value, the substrate calorific value and the substrate temperature based on a heat transfer phenomenon between the respective phases that is caused by a difference in temperature between coils of the respective phases and a heat transfer phenomenon between the coil and the control substrate; wherein the coil temperature estimating section estimates the coil temperature by a corrected coil calorific value and a corrected substrate calorific value that are obtained by correcting the coil calorific value and the substrate calorific value that are obtained in a normal system, and the substrate temperature, when an abnormality occurs in any of systems; and wherein the heat transfer phenomenon is expressed by a differential equation.

The above-described object of the present invention is more effectively achieved by that wherein the coil temperature estimating section obtains the corrected coil calorific value and the corrected substrate calorific value by multiplying the coil calorific value and the substrate calorific value by a gain; or wherein the coil temperature estimating section comprises: a coil calorific value calculating section that obtains the coil calorific value and the corrected coil calorific value by the motor current of the phase, a substrate calorific value calculating section that obtains the substrate calorific value and the corrected substrate calorific value by the motor current, and a coil temperature calculating section that obtains the coil temperature by the coil calorific value and the substrate calorific value, or the corrected coil calorific value and the corrected substrate calorific value, and the substrate temperature, based on the differential equation; or wherein coil calorific value calculating section changes a coil resistance of the phase used to obtain the coil calorific value, depending on the coil temperature of a corresponding phase, and wherein the substrate calorific value calculating section changes a substrate resistance used to obtain the substrate calorific value, depending on the substrate temperature; or wherein the differential equation includes difference information between the coil temperature and the substrate temperature.

Effects of the Invention

Since estimating the coil temperature of respective phases by using the relational expression that is obtained by considering the heat transfer phenomenon between the coil and the control substrate in addition to the heat transfer phenomenon between respective phases which is caused by the difference in temperature between the coils of respective phases, the electric power steering apparatus according to the present invention enables more precise estimation of the temperature. Further, the electric power steering apparatus enables simple and precise estimation of the temperature because it estimates the coil temperature by correcting the calorific value of the normal system when the abnormality occurs in any of the systems.

BRIEF DESCRIPTION OF THE DRAWINGS

In the accompanying drawings:

FIG. 15 is a flowchart showing an operating example of estimation of a coil temperature.

MODE FOR CARRYING OUT THE INVENTION

The present invention estimates temperatures of coils in respective phases (a U-phase, a V-phase and a W-phase) of a poly-phase motor on the basis of a heat transfer phenomenon (a heat conduction, a heat radiation, a heat convection, and so on) between respective phases and a heat transfer phenomenon between each coil and a substrate (a control substrate) of a control unit (ECU). In the poly-phase motor, a difference in calorific values of respective coils occurs by such as dispersion of currents (motor currents) passing through the coils in respective phases, and that causes a difference in temperature between respective coils. This difference in temperature causes heat transfer phenomena between respective phases and between each coil and open air environment, while a difference in temperature occurs also between the control substrate and each coil. Since the control substrate and the motor are generally close, heat transfer phenomena also occur between the control substrate and each coil and between the control substrate and the open air environment. The present invention expresses those heat transfer phenomena by a differential equation, and estimates the coil temperature using a motor current and a temperature of the control substrate (a substrate temperature) by including difference information between the coil temperature and the substrate temperature in the differential equation. Further, the present invention uses a motor having a multi-system motor winding so as to continue a motor operation even if an abnormality (including a failure) occurs in a motor system. When the abnormality occurs in any of the systems, the present invention corrects a calorific value obtained by means of a motor current of a normal system, for example, by using multiplication of a gain, and estimates the coil temperature on the basis of the corrected calorific value. This enables simple and precise estimation of the temperature at both normal time and abnormal time.

Hereinafter, an embodiment of the present invention will be described with reference to the accompanying drawings.

The present embodiment uses a three-phase motor having a two-system motor winding. First, an example of the motor will be described with reference to FIG. 4 and FIG. 5. Although the motor is an electric motor, the following explanations merely describe it as a "motor".

Figure 4:
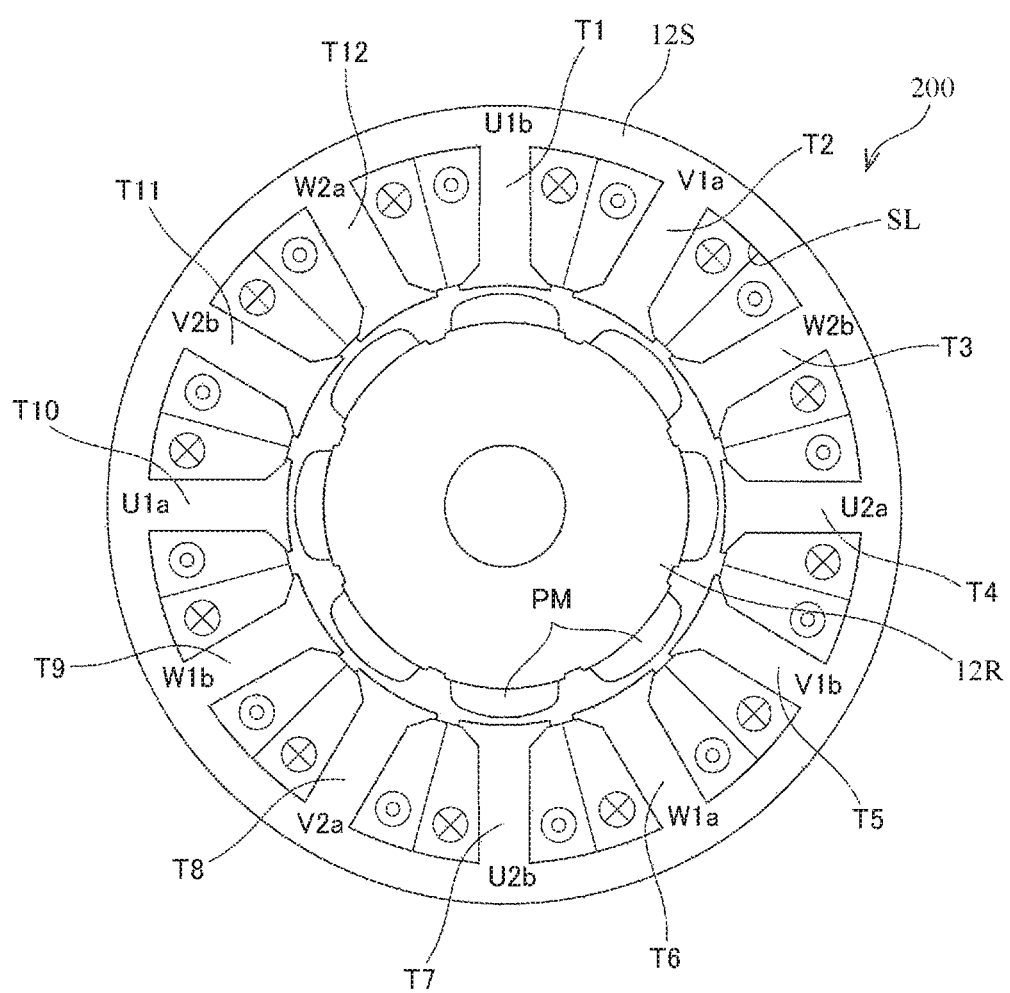
FIG. 4 is a one-side sectional view showing a structure example of a motor being capable of the present invention.

As shown in FIG. 4, a three-phase motor 200 has a configuration of a surface permanent magnet (SPM) motor that includes a stator 12S having teeth T which are magnetic poles and form slots SL inwardly protruding at an inner periphery, and an eight-pole surface magnet-type rotor 12R which is rotatably disposed opposite to the teeth T at the inner periphery of the stator 12S and wherein permanent magnets PM are mounted on the surface. Here, the number of the teeth T of the stator 12S is set to "phase number×2n" ("n" is an integer which is two or more). For example, in the case of n=2, the motor has a configuration of eight poles and twelve slots. Moreover, the number of the pole is not limited to 8, and the number of the slot is not limited to 12.

Figure 5:
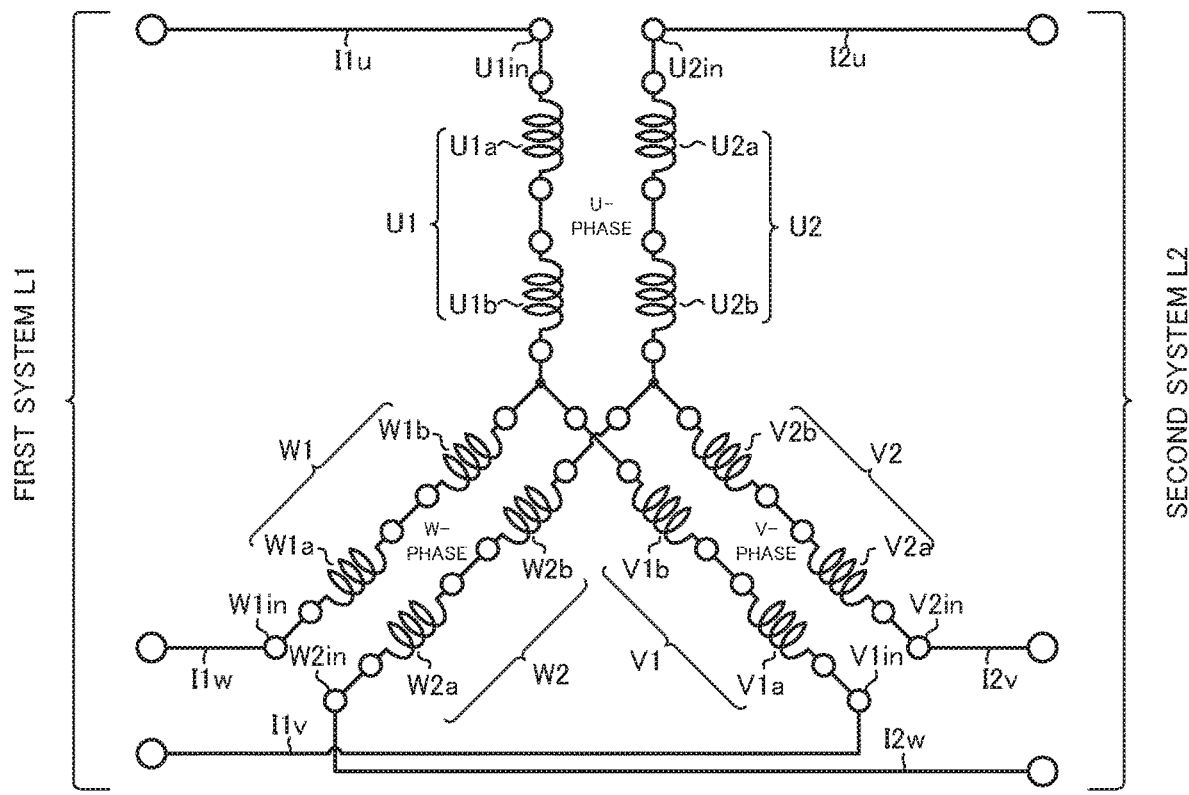
FIG. 5 is a schematic diagram showing a structure example of a winding of the motor being capable of the present invention.

In the two systems as shown in FIG. 5, a first three-phase motor winding L1 and a second three-phase motor winding L2, which are poly-phase motor windings where each of the same phase magnetic poles is in phase with the rotor magnets, are wound on the slots SL of the stator 12S. In the first three-phase motor winding L1, respective one-ends of a U-phase coil U1, a V-phase coil V1 and a W-phase coil W1 are connected each other so as to form a star-connection. The other ends of the phase coils U1, V1 and W1 are connected to an ECU of an electric power steering apparatus, and motor driving currents I1u, I1v and I1w are individually supplied to the respective coils.

In the phase coils U1, V1 and W1, two coil sections U1a and U1b, V1a and V1b, and W1a and W1b are respectively formed. The coil sections U1a, V1a and W1a are wound on the teeth T10, T2 and T6 whose positions form an equilateral triangle by concentrated winding. Further, the coil sections U1b, V1b and W1b are wound on the teeth T1, T5 and T9 which are disposed at the positions where the teeth T10, T2 and T6 are respectively shifted by 90 degrees clockwise by concentrated winding.

Further, in the second three-phase motor winding L2, respective one-ends of a U-phase coil U2, a V-phase coil V2 and a W-phase coil W2 are connected each other so as to form the star-connection. The other ends of the phase coils U2, V2 and W2 are connected to the ECU of the electric power steering apparatus, and motor driving currents I2u, I2v and I2w are individually supplied to the respective coils.

In the phase coils U2, V2 and W2, two coil sections U2a and U2b, V2a and V2b, and W2a and W2b are respectively formed. The coil sections U2a, V2a and W2a are wound on the teeth T4, T8 and T12 whose positions form the equilateral triangle by concentrated winding. Further, the coil sections U2b, V2b and W2b are wound on the teeth T7, T11 and T3 which are disposed at the positions where the teeth T4, T8 and T12 are respectively shifted by 90 degrees clockwise by concentrated winding.

Then, the coil sections U1a and U1b, V1a and V1b, and W1a and W1b of the phase coils U1, V1 and W1, and the coil sections U2a and U2b, V2a and V2b, and W2a and W2b of the phase coils U2, V2 and W2 are wound on the slots SL which sandwich the respective teeth T so that the current directions are the same direction.

As stated above, the coil sections U1a and U1b, V1a and V1b, and W1a and W1b of the phase coils U1, V1 and W1 which form the first three-phase motor winding L1, and the coil sections U2a and U2b, V2a and V2b, and W2a and W2b of the phase coils U2, V2 and W2 which form the second three-phase motor winding L2, are wound on the twelve teeth T which are different each other.

Figure 6:
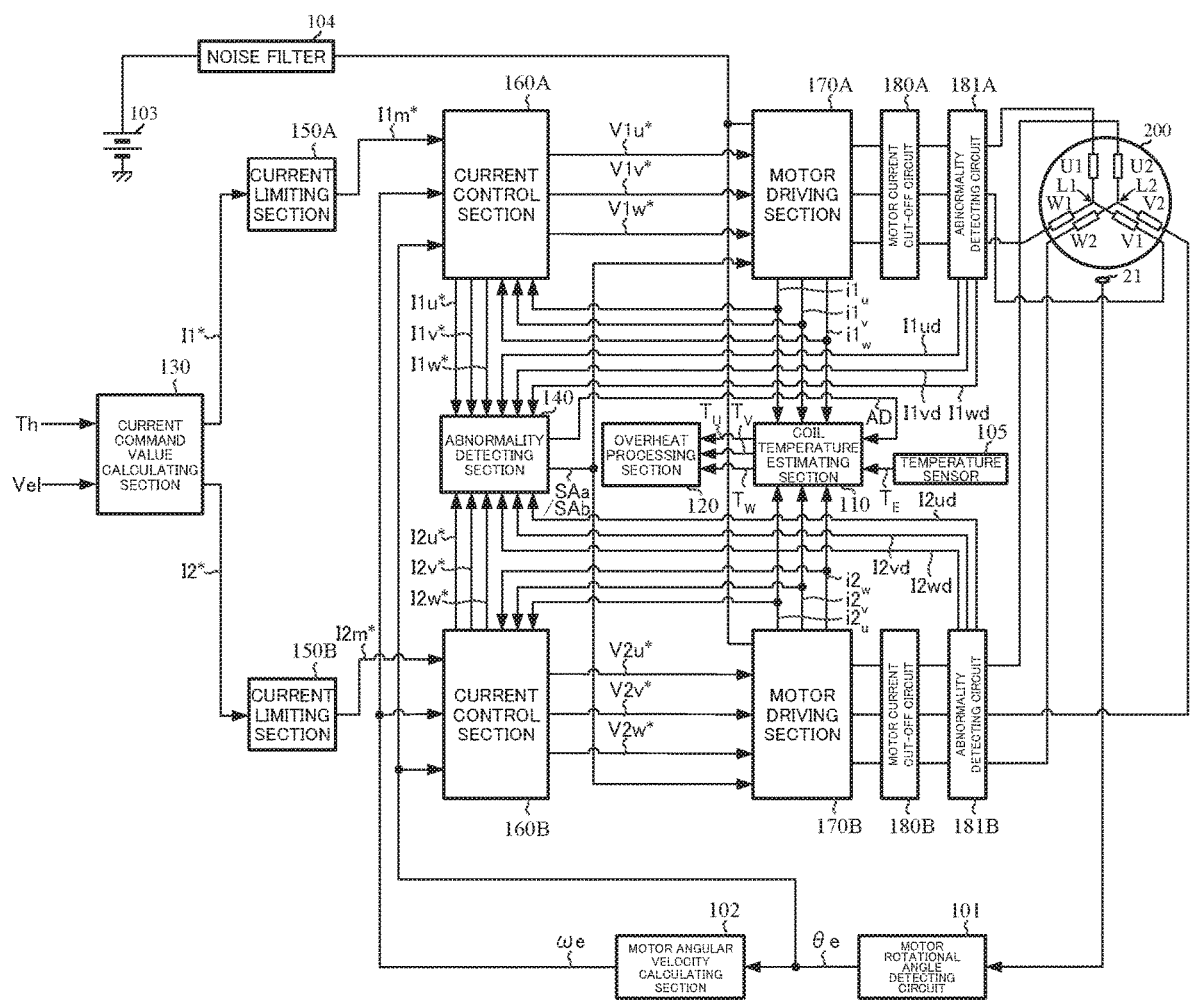
FIG. 6 is a block diagram showing a configuration example of the present invention.

For such a three-phase motor having the two-system winding, a configuration example of an embodiment of the present invention that supplies a current from an individual inverter, decides a switching means where a failure occurs when an OFF-failure (an open failure) or an ON-failure (a short failure) where a switching means of one inverter becomes shut-down occurs, controls a switching means except the faulty switching means, controls a normal inverter except the faulty inverter including the faulty switching means, and continues estimation of the coil temperature, will be described with reference to FIG. 6. Hereinafter, a system of the three-phase motor winding L1 is referred to a "first system", and a system of the three-phase motor winding L2 is referred to a "second system".

Figure 7:
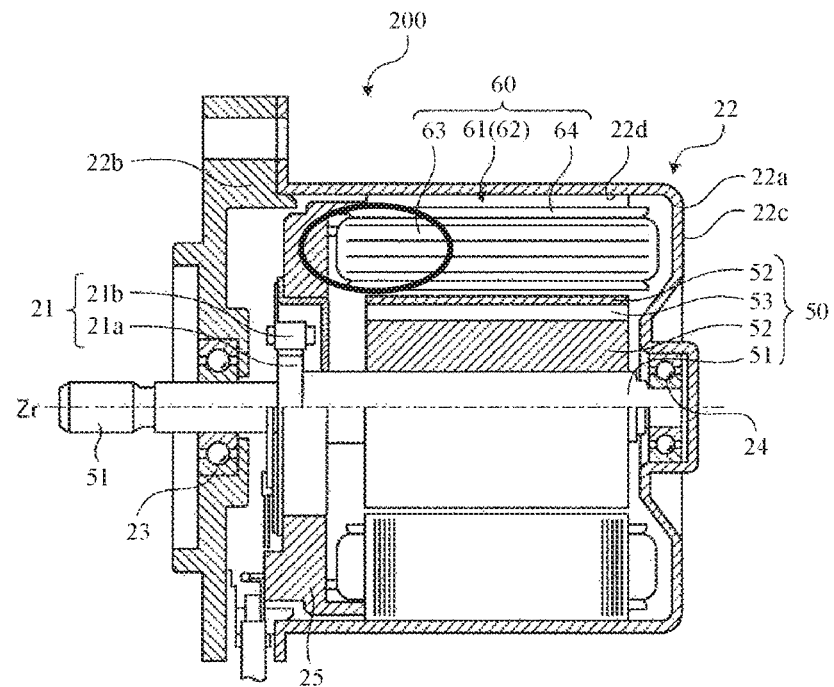
FIG. 7 is a sectional view which schematically shows a side obtained by cutting a configuration of the motor with a virtual plane including a central axis.

An object for estimation of the coil temperature in the present embodiment is a coil shown by the circle in FIG. 7. FIG. 7 is a sectional view which schematically shows a side obtained by cutting a configuration of the three-phase motor 200 with a virtual plane including a central axis Zr. The three-phase motor 200 comprises a rotational angle sensor (a resolver) 21, a housing 22, bearings 23 and 24, a rotor 50, and a stator 60. The resolver 21 comprises a resolver rotor 21a and a resolver stator 21b, and is supported by a terminal block 25. The housing 22 includes a cylindrical housing 22a and a front bracket 22b, and a bottom part 22c is formed at an opposite end to the front bracket 22b in the cylindrical housing 22a so as to block the end. The bearing 23 rotatably supports one end of a shaft 51 which is a part of the rotor 50 located inside the cylindrical housing 22a, the bearing 24 rotatably supports the other end of the shaft 51, and thus the shaft 51 rotates around the central axis Zr. The rotor 50 includes the shaft 51, a rotor yoke 52 and a magnet 53. The stator 60 includes a cylindrical stator core 61 and a coil (an exciting coil) 63, and the exciting coil 63 is wound onto the stator core 61. The stator core 61 includes a plurality of split cores 62, and the exciting coil 63 is concentratedly wound outside teeth (not shown) of the split cores 62 through an insulator (a member to insulate the split cores 62 from the exciting coil 63). As described above, a temperature of the coil shown by the circle in the exciting coil 63 is estimated.

Figure 8:
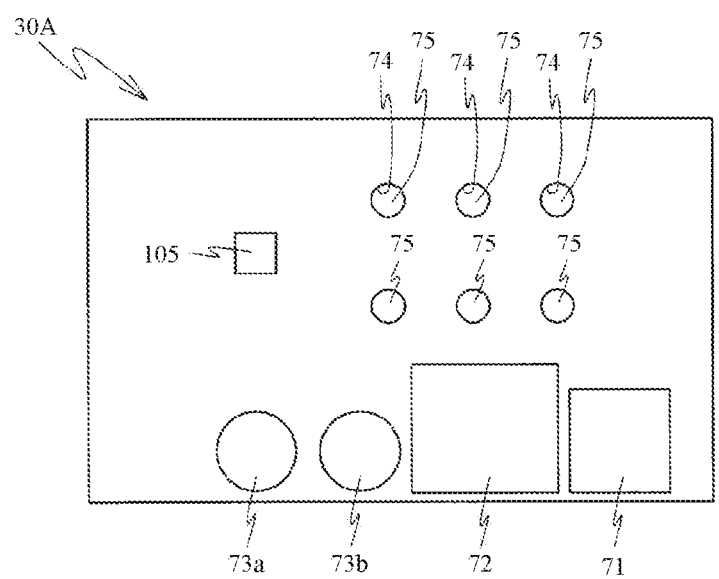
FIG. 8 is a bottom view of a power circuit substrate.

In FIG. 6, a temperature sensor 105 detects a temperature of the control substrate, and outputs it as a substrate temperature $T_E$. As the temperature sensor 105, what detects the substrate temperature $T_E$ and can be equipped may be used, and, for example, a thermistor is used. An ECU 30 comprises a power circuit substrate and a control circuit substrate that are arranged at a predetermined interval in parallel each other as the control substrate. FIG. 8 shows a bottom side of a power circuit substrate 30A. A temperature sensor (a thermistor) 105 detects a temperature of three-phase bridges of FETs (FET1 to FET6) mounted of the upper surface of the power circuit substrate 30A as the substrate temperature $T_E$. On the bottom side of the power circuit substrate 30A, a relay circuit 71, a coil 72 for noise countermeasure, and electrolytic capacitors 73a and 73b for smoothing a power supply are arranged, through-holes 74 that pierce the power circuit substrate 30A are formed at the positions opposite to the undersides of the FET1 to FET6 respectively, and discoid copper coins 75 serving as heat conductive members are press-fitted into the through-holes 74 respectively. Since the thermistor 105 is connected to the undersides of the copper coins 75 touching the FET1 to FET6 through a heat conductive grease with insulation (not shown), it is possible to make heat resistances between the thermistor 105 and the FET1 to FET6 small and conduct heating temperatures of the FET1 to FET6 to the thermistor 105 with the low heat resistances, dispersion of the heat resistances between a plurality of FET1 to FET6 and the thermistor 105 becomes small, and it is possible to accurately measure the temperatures of the FET1 to FET6.

The present embodiment comprises a current command value calculating section 130 that calculates current command values I1* and I2* for the respective systems. In order to drive and control the three-phase motor 200 on the basis of the current command values I1* and I2*, the present embodiment comprises current limiting sections 150A and 150B that limit the maximum currents of the current command values I1* and I2* respectively, current control sections 160A and 160B that calculate voltage command values, motor driving sections 170A and 170B that input the voltage command values, and motor current cut-off circuits 180A and 180B that are interposed between output sides of the motor driving sections 170A and 170B and the first motor winding L1 and the second motor winding L2 of the three-phase motor 200, for the respective systems. The present embodiment comprises abnormality detecting circuits 181A and 181B that are connected to the motor current cut-off circuits 180A and 180B, and an abnormality detecting section 140 that detects the abnormality on the basis of outputs from the abnormality detecting circuits 181A and 181B and outputs from the current control sections 160A and 160B. Further, in order to estimate the coil temperature, the present embodiment comprises the temperature sensor 105 and a coil temperature estimating section 110, and comprises also an overheat processing section 120 that detects overheating of the coil on the basis of the estimated coil temperature.

The three-phase motor 200 comprises a rotational angle sensor 21 such as a Hall element that detects a rotational angle of the rotor, a value detected by the rotational angle sensor 21 is inputted into a motor rotational angle detecting circuit 101, a motor rotational angle (that is an electric angle) θe is detected at the motor rotational angle detecting circuit 101, the motor rotational angle θe is inputted into a motor angular velocity calculating section 102, and a motor angular velocity ωe is calculated at the motor angular velocity calculating section 102. Further, a direct current is supplied to the motor driving sections 170A and 170B through a noise filter 104 from a battery 103 serving as a direct-current power source.

Figure 1:
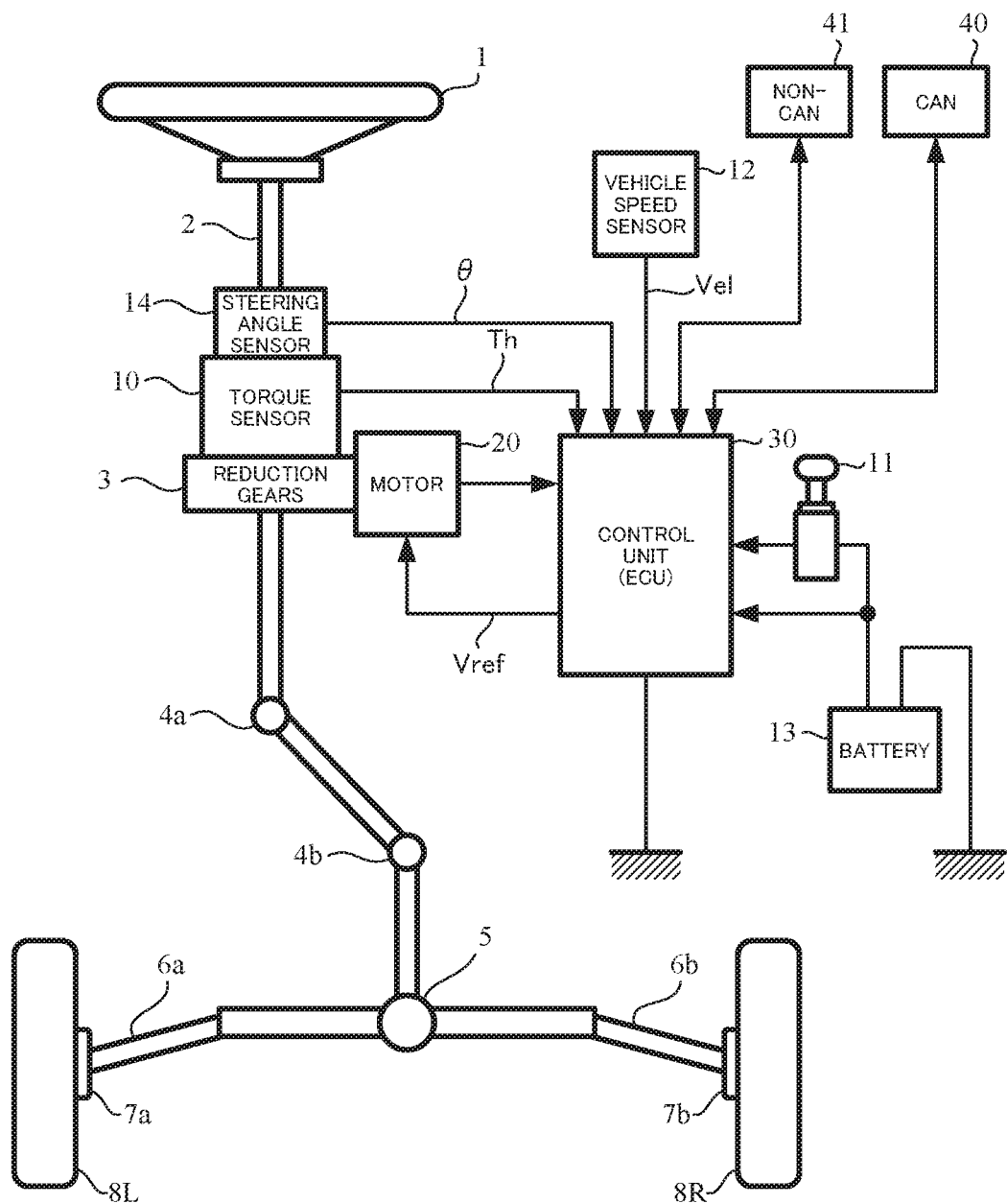
FIG. 1 is a configuration diagram illustrating a general outline of an electric power steering apparatus.
Figure 2:
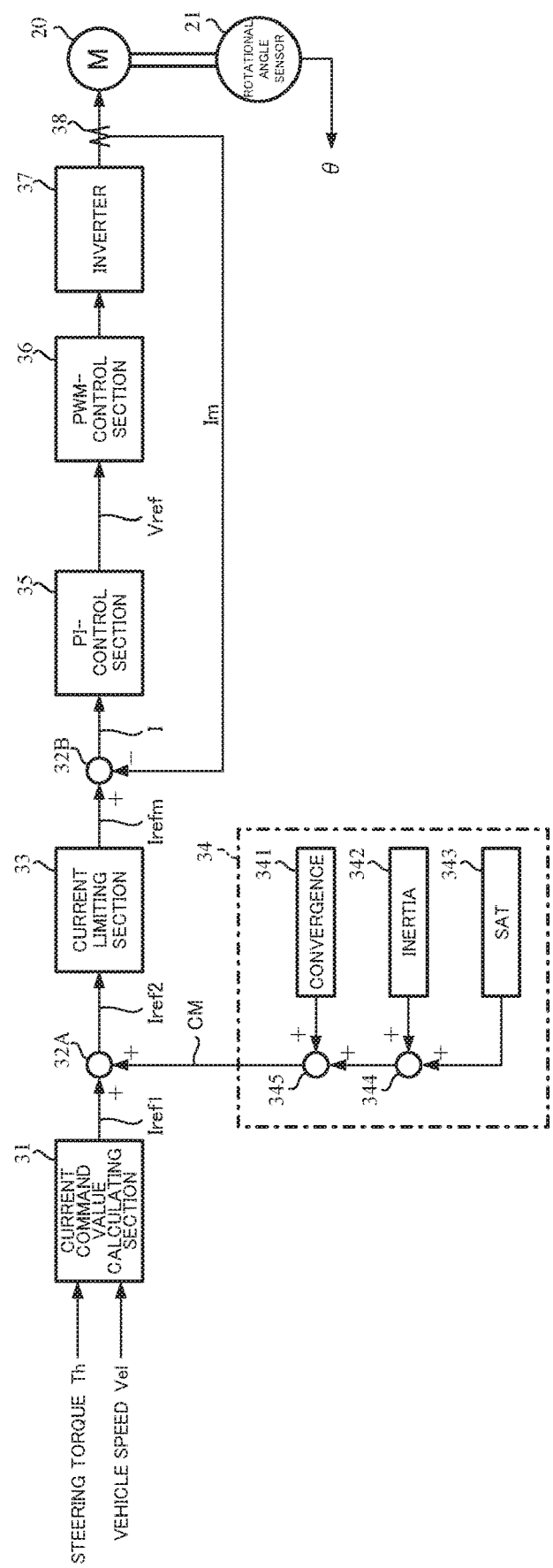
FIG. 2 is a block diagram showing a configuration example of a control unit (ECU) of the electric power steering apparatus.

The current command value calculating section 130 calculates a current command value on the basis of a steering torque Th and a vehicle speed Vel by using an assist map or the like as with a current command value calculating section 31 shown in FIG. 2. Assuming that the first system and the second system drive the three-phase motor 200 equally in the present embodiment, the current command value calculating section 130 halves the current command value necessary to drive the motor, and outputs them as the current command values I1* and I2* for the respective systems. Moreover, it is possible to add a compensation signal generating section 34 and add a compensation signal CM from the compensation signal generating section 34 to the current command value as with a configuration example shown in FIG. 2.

As with a current limiting section 33 shown in FIG. 2, current limiting sections 150A and 150B limit the maximum currents of the current command values I1* and I2* respectively, and output current command values I1m* and I2m*.

The current control section 160A calculates a three-phase voltage command value (consisting of a U-phase voltage command value V1u*, a V-phase voltage command value V1v*, and a W-phase voltage command value V1w*) for the motor driving section 170A on the basis of the current command value I1m*, a three-phase motor current (consisting of a U-phase motor current i1$_u$, a V-phase motor current i1$_v$, and a W-phase motor current i1$_w$) fed back from the motor driving section 170A, the motor rotational angle θe, and the motor angular velocity ωe.

Figure 9:
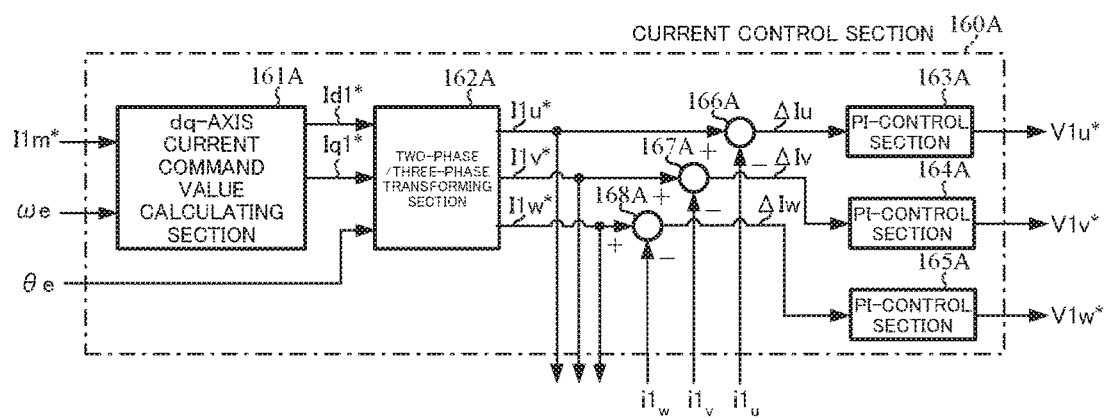
FIG. 9 is a block diagram showing a configuration example of a current control section.

A configuration example of the current control section 160A is shown in FIG. 9. The current control section 160A comprises a dq-axis current command value calculating section 161A, a two-phase/three-phase transforming section 162A, PI-control sections 163A, 164A and 165A, and subtracting sections 166A, 167A and 168A. The dq-axis current command value calculating section 161A calculates a d-axis current command value Id1* and a q-axis current command value Iq1* that are current command values in a dq-rotary coordinate system on the basis of the current command value I1m* and the motor angular velocity ωe. For example, the dq-axis current command value calculating section 161A calculates the d-axis current command value Id1* and the q-axis current command value Iq1* by a method performed in a d-q axis current command value calculating section described in a publication of Japanese Patent No. 5282376 B2. In the calculation, when a motor angular velocity corresponding to a mechanical angle of the motor is needed, it is calculated on the basis of the motor angular velocity ωe corresponding to an electric angle. The two-phase/three-phase transforming section 162A transforms a two-phase current command value consisting of the d-axis current command value Id1* and the q-axis current command value Iq1* into a three-phase current command value (consisting of a U-phase current command value I1u*, a V-phase current command value I1v*, and a W-phase current command value I1w*) in a UVW-fixed coordinate system by using the motor rotational angle θe on the basis of a spatial vector modulation (a spatial vector transformation). The three-phase current command value is inputted into the abnormality detecting section 140, and is addition-inputted into the subtracting sections 166A, 167A and 168A respectively. The three-phase motor current (the U-phase motor current i1$_u$, the V-phase motor current i1$_v$, and the W-phase motor current i1$_w$) fed back by the motor driving section 170A has been subtraction-inputted into the subtracting sections 166A, 167A and 168A, deviations ΔIu, ΔIv and ΔIw between the three-phase current command value and the three-phase motor current are obtained at the subtracting sections 166A, 167A and 168A respectively, and the respective deviations are inputted into the PI-control sections 163A, 164A and 165A respectively. As with a PI-control section 35 shown in FIG. 2, the PI-control sections 163A, 164A and 165A obtain the three-phase voltage command value (the U-phase voltage command value V1u*, the V-phase voltage command value V1v*, and the W-phase voltage command value V1w*) on the basis of the deviations ΔIu, ΔIv and ΔIw respectively.

The current control section 160B calculates a three-phase voltage command value (consisting of a U-phase voltage command value V2u*, a V-phase voltage command value V2v*, and a W-phase voltage command value V2w*) for the motor driving section 170B on the basis of the current command value I2m*, a three-phase motor current (consisting of a U-phase motor current i2$_u$, a V-phase motor current i2$_v$, and a W-phase motor current i2$_w$) fed back from the motor driving section 170B, the motor rotational angle θe, and the motor angular velocity ωe, by the same configuration and operations as the current control section 160A. A three-phase current command value (consisting of a U-phase current command value I2u*, a V-phase current command value I2v*, and a W-phase current command value I2w*) calculated at the current control section 160B is also inputted into the abnormality detecting section 140.

Figure 10A:
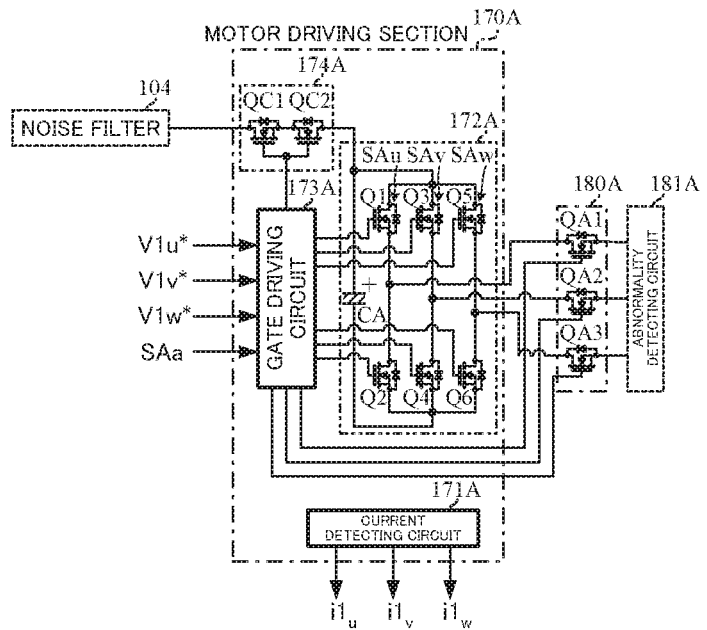
FIGS. 10A and 10B are block diagrams showing a configuration example of a motor driving section and a motor current cut-off circuit.
Figure 10B:
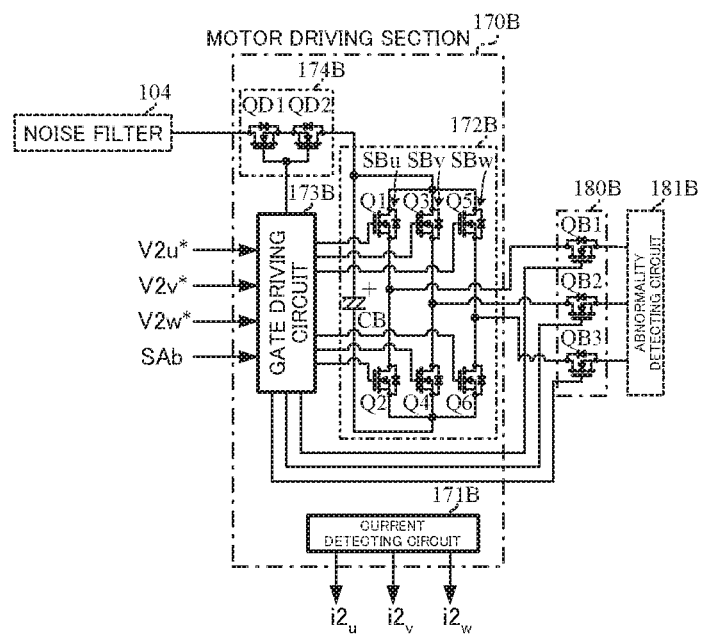

In addition to the U-phase current command value I1u*, the V-phase current command value I1v*, the W-phase current command value I1w*, the U-phase current command value I2u*, the V-phase current command value I2v* and the W-phase current command value I2w*, detected motor current values I1ud, I1vd, I1wd, I2ud, I2vd, and I2wd that are detected by the abnormality detecting circuits 181A and 181B provided between the motor current cut-off circuits 180A and 180B and the first motor winding L1 and the second motor winding L2 of the three-phase motor 200, are inputted into the abnormality detecting section 140. Here, a configuration example of the motor driving section 170A and the motor current cut-off circuit 180A is shown in FIG. 10A, and a configuration example of the motor driving section 170B and the motor current cut-off circuit 180B is shown in FIG. 10B. The motor driving sections 170A and 170B respectively comprise gate driving circuits 173A and 173B that generate gate signals by inputting the three-phase voltage command value (V1u*, V1v* and V1w*) outputted from the current control section 160A and the three-phase voltage command value (V2u*, V2v* and V2w*) outputted from the current control section 160B and that serve as the current control sections at abnormal time, inverters 172A and 172B that input the gate signals outputted from the gate driving circuits 173A and 173B, and current detecting circuits 171A and 171B. The abnormality detecting section 140 detects an open failure (an OFF-failure) and a short failure (an ON-failure) of field effect transistors (FETs) Q1 to Q6 serving as switching elements that constitute the inverters 172A and 172B by comparing the inputted detected motor current values I1ud to I1wd and I2ud to I2wd with the three-phase current command values (I1u* to I1w*, and I2u* to I2w*) respectively. When detecting the abnormality caused by the open failure or the short failure of the FETs constituting the inverters 172A and 172B, the abnormality detecting section 140 outputs an abnormal system cut-off command SAa or SAb to the gate driving circuit 173A or 173B of the motor driving section 170A or 170B where the abnormality is detected, and outputs an abnormal detection signal AD to the coil temperature estimating section 110. In order that the system where the abnormality is detected is identified by the abnormal detection signal AD, for example, the abnormality detecting section 140 sets the abnormal detection signal AD to "1" when the first system is abnormal, sets the abnormal detection signal AD to "2" when the second system is abnormal, and sets the abnormal detection signal AD to "3" when the both systems are abnormal.

When the three-phase voltage command values are inputted from the current control sections 160A and 160B, each of the gate driving circuits 173A and 173B in the motor driving sections 170A and 170B generates six PWM-signals (gate signals) on the basis of these voltage command values and a carrier signal of a triangular wave, and outputs these PWM-signals to the inverters 172A and 172B.

Further, at the normal time when the abnormal system cut-off command SAa is not inputted from the abnormality detecting section 140, the gate driving circuit 173A outputs three gate signals of high level to the motor current cut-off circuit 180A, and outputs two gate signals of high level to a power source cut-off circuit 174A. At the abnormal time when the abnormal system cut-off command SAa has been inputted from the abnormality detecting section 140, the gate driving circuit 173A simultaneously outputs three gate signals of low level to the motor current cut-off circuit 180A, cuts off the motor current, simultaneously outputs two gate signals of low level to the power source cut-off circuit 174A, and cuts off a battery power.

Similarly, at the normal time when the abnormal system cut-off command SAb is not inputted from the abnormality detecting section 140, the gate driving circuit 173B outputs three gate signals of high level to the motor current cut-off circuit 180B, and outputs two gate signals of high level to a power source cut-off circuit 174B. At the abnormal time when the abnormal system cut-off command SAb has been inputted from the abnormality detecting section 140, the gate driving circuit 173B simultaneously outputs three gate signals of low level to the motor current cut-off circuit 180B, cuts off the motor current, simultaneously outputs two gate signals of low level to the power source cut-off circuit 174B, and cuts off the battery power.

A battery current of the battery 103 is inputted into the inverters 172A and 172B respectively through the noise filter 104 and the power source cut-off circuits 174A and 174B, and electrolytic capacitors CA and CB for smoothing are respectively connected to input sides of the inverters 172A and 172B.

Figure 3:
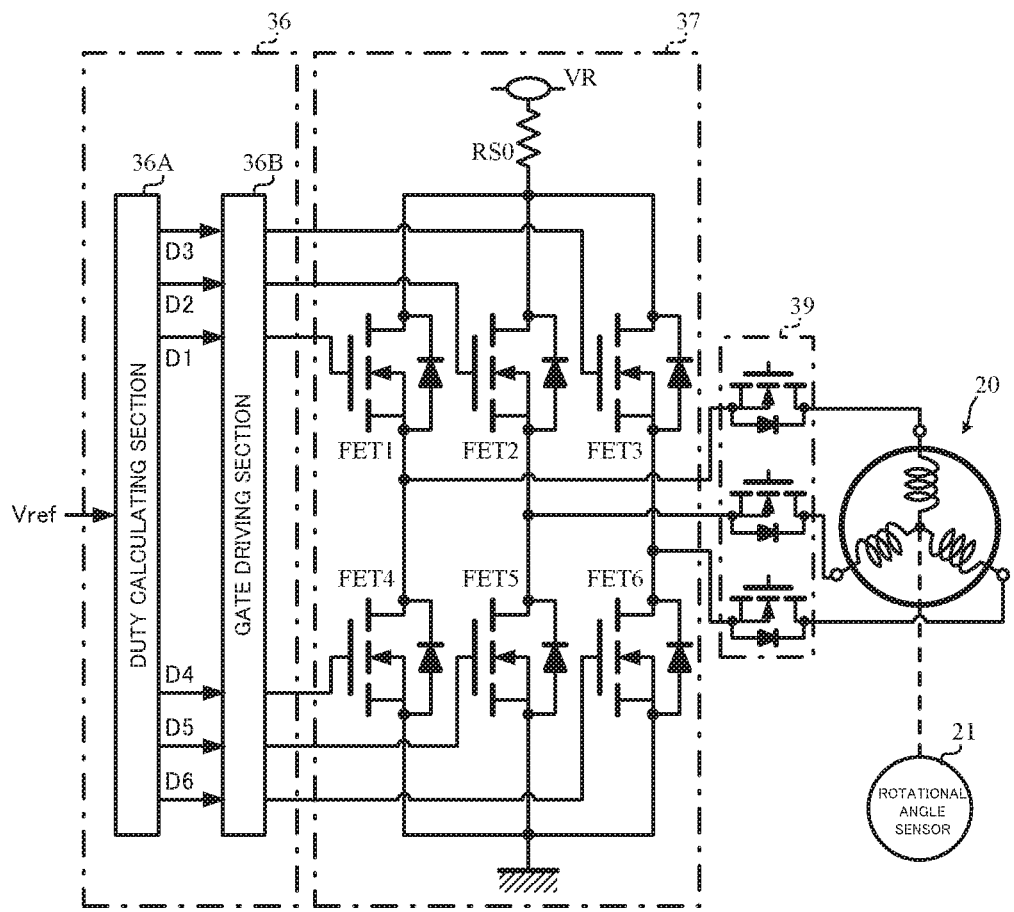
FIG. 3 is a diagram showing a configuration example of a motor control section of the electric power steering apparatus.

The inverters 172A and 172B respectively have six FETs Q1 to Q6 (corresponding to the FET1 to FET6 shown in FIG. 3) serving as switching elements, and have a configuration created by connecting in parallel three switching-arms (SAu, SAv and SAw in the inverter 172A; SBu, SBv and SBw in the inverter 172B) that are configured by connecting in series two FETs. U-phase currents I1u and I2u, V-phase currents I1v and I2v, and W-phase currents I1w and I2w, which are the motor driving currents, are inputted from a connection between the FETs of each switching-arm into the first motor winding L1 and the second motor winding L2 of the three-phase motor 200 through the motor current cut-off circuits 180A and 180B by inputting the PWM-signals outputted from the gate driving circuits 173A and 173B into the gates of the FETs Q1 to Q6.

A both-end voltage of a shunt resistor, which is not shown in FIGS. 10A and 10B, interposed between each switching-arm of the inverters 172A and 172B and the ground is inputted into the current detecting circuits 171A and 171B in the motor driving sections 170A and 170B, and the three-phase motor currents ($i1_u$, $i1_v$ and $i1_w$, and $i2_u$, $i2_v$ and $i2_w$) are detected.

The motor current cut-off circuit 180A has three FETs QA1, QA2 and QA3 for current cut-off, and the motor current cut-off circuit 180B has three FETs QB1, QB2 and QB3 for current cut-off. The FETs QA1 to QA3 and the FETs QB1 to QB3 of the motor current cut-off circuits 180A and 180B are respectively connected in the same direction so as to dispose cathodes of parasitic diodes of respective groups of FETs at the inverters 172A and 172B sides.

The power source cut-off circuits 174A and 174B respectively have a series circuit configuration that two FETs QC1 and QC2 and two FETs QD1 and QD2 are disposed so that drains are connected each other and parasitic diodes are provided in an opposite direction. Sources of the FETs QC1 and QD1 are connected each other, and are connected to an output side of the noise filter 104. Sources of the FETs QC2 and QD2 are respectively connected to sources of the FETs Q1, Q2 and Q3 of the inverters 172A and 172B.

The coil temperature estimating section 110 estimates coil temperatures $T_U$, $T_V$ and $T_W$ of respective phases on the basis of the three-phase motor current from the motor driving section 170A or the motor driving section 170B when the abnormality does not occur in any of the systems and the systems are normal, or the three-phase motor current of a normal system when the abnormality occurs in any of the systems, in addition to the substrate temperature $T_E$ from the temperature sensor 105. The system where the abnormality occurs is judged by the abnormal detection signal AD from the abnormality detecting section 140. The present embodiment estimates the coil temperature on the basis of the three-phase motor current from the motor driving section 170A at the normal time.

Figure 11:
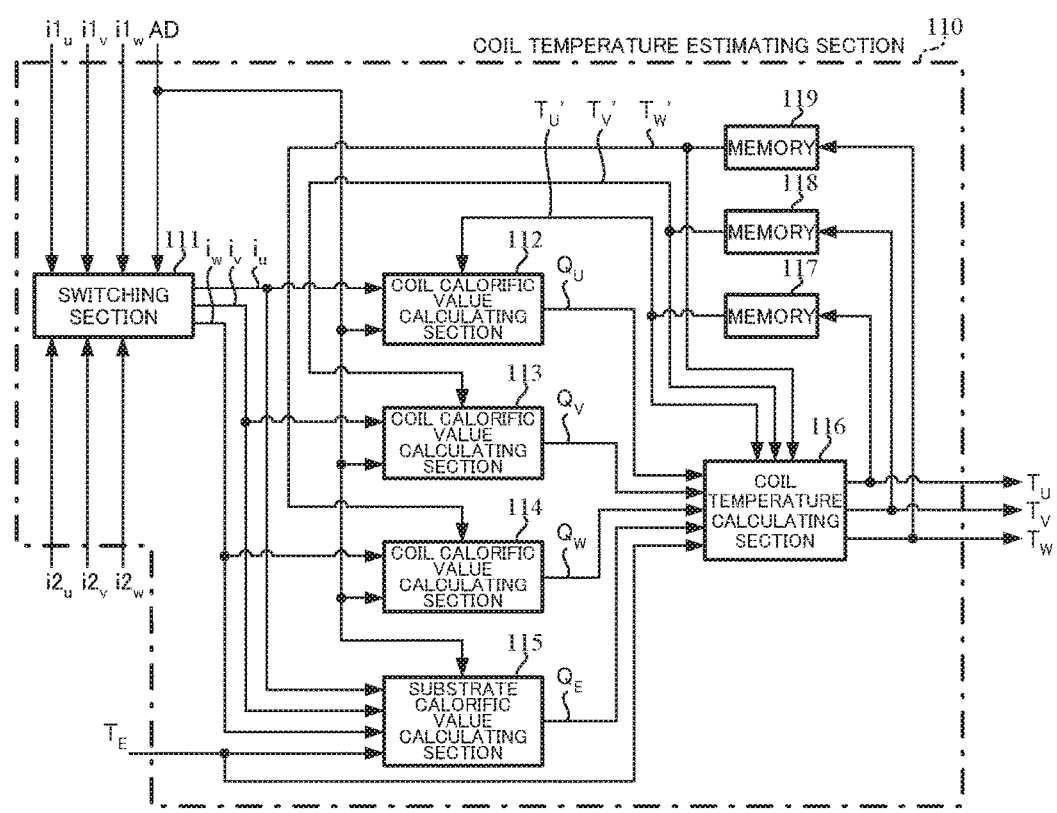
FIG. 11 is a block diagram showing a configuration example of a coil temperature estimating section.

A configuration example of the coil temperature estimating section 110 is shown in FIG. 11. The coil temperature estimating section 110 comprises a switching section 111, coil calorific value calculating sections 112, 113 and 114, a substrate calorific value calculating section 115, a coil temperature calculating section 116, and memories 117, 118 and 119.

The switching section 111 inputs the three-phase motor current from the motor driving section 170A and the three-phase motor current from the motor driving section 170B, and selects the motor current used for the estimation of the coil temperature. At the normal time, the switching section 111 selects the three-phase motor current (the U-phase motor current $i1_u$, the V-phase motor current $i1_v$ and the W-phase motor current $i1_w$) from the motor driving section 170A, and outputs it as a U-phase motor current $i_u$, a V-phase motor current $i_v$ and a W-phase motor current $i_w$. At the abnormal time, the switching section 111 judges a system where the abnormality occurs by the abnormal detection signal AD, and outputs the three-phase motor current from the motor driving section in a normal system as the U-phase motor current $i_u$, the V-phase motor current $i_v$ and the W-phase motor current $i_w$.

The coil calorific value calculating sections 112, 113 and 114 respectively calculate calorific values of coils (coil calorific values) $Q_U$, $Q_V$ and $Q_W$ in respective phases. Methods to calculate the coil calorific value are different between at the normal time and at the abnormal time. It is judged whether the systems are normal or abnormal on the basis of existence or nonexistence of input of the abnormal detection signal AD outputted from the abnormality detecting section 140.

First, the calculation of the coil calorific value at the normal time will be described.

Though a calorific value can be obtained from an expression of electric power occurring in a resistance, a resistance of a coil (a coil resistance) in each phase is changed depending on the coil temperature in each phase. Therefore, the calorific values $Q_U$, $Q_V$ and $Q_W$ are calculated in accordance with the following expressions 1 to 3 by dealing with the coil resistance as a function of the coil temperature.

$$Q_U = R_U(T_U) \times i_u(t)^2 \qquad \text{[Expression 1]}$$

$$Q_V = R_V(T_V) \times i_v(t)^2 \qquad \text{[Expression 2]}$$

$$Q_W = R_W(T_W) \times i_w(t)^2 \qquad \text{[Expression 3]}$$

Here, $R_U(T_U)$, $R_V(T_V)$ and $R_W(T_W)$ are the coil resistances of the U-phase, the V-phase and the W-phase respectively, and are converted into the sum of those in both systems (the first system and the second system). $T_U$, $T_V$ and $T_W$ are the coil temperatures of the U-phase, the V-phase and the W-phase respectively. The motor currents $i_u$, $i_v$ and $i_w$ are expressed as functions of time t.

Moreover, the coil resistances $R_U(T)$, $R_V(T)$ and $R_W(T)$ in the case that the coil temperature is T, can be calculated in accordance with the following expressions 4 to 6 when the coil resistances at a reference temperature $T_b$ are $R_{uo}$, $R_{vo}$ and $R_{wo}$ respectively.

$$R_U(T) = R_{U0} \times \{1 + \alpha_U \times (T - T_b)\} \qquad \text{[Expression 4]}$$

$$R_V(T) = R_{V0} \times \{1 + \alpha_V \times (T - T_b)\} \qquad \text{[Expression 5]}$$

$$R_W(T) = R_{W0} \times \{1 + \alpha_W \times (T - T_b)\} \qquad \text{[Expression 6]}$$

Here, $\alpha_U$, $\alpha_V$ and $\alpha_W$ are temperature coefficients of the U-phase, the V-phase and the W-phase respectively, for example, become $4.4 \times 10^{-3}$ [1/° C.] when the coil is a copper, and may be finely adjusted by an experiment and so on.

The calorific values $Q_U$, $Q_V$ and $Q_W$ can be calculated in accordance with the following expressions 7 to 9 by substituting the expressions 4 to 6 for the expressions 1 to 3 respectively.

$$Q_U = R_{U0} \times \{1 \pm \alpha_U \times (T_U - T_b)\} \times i_u(t)^2 \qquad \text{[Expression 7]}$$

$$Q_V = R_{V0} \times \{1 \pm \alpha_V \times (T_V - T_b)\} \times i_v(t)^2 \qquad \text{[Expression 8]}$$

$$Q_W = R_{W0} \times \{1 \pm \alpha_W \times (T_W - T_b)\} \times i_w(t)^2 \qquad \text{[Expression 9]}$$

At the normal time, the coil calorific value calculating sections 112, 113 and 114 calculate the calorific values $Q_U$, $Q_V$ and $Q_W$ by using the above expressions 7 to 9 respectively.

Next, the calculation of the coil calorific value (a corrected coil calorific value) at the abnormal time when the abnormality occurs in any of the systems, will be described.

When the abnormality occurs in any of the systems, a current passes through only normal system, so that calorific values obtained by multiplying the calorific values in the normal state by a gain $\beta$ ($0 < \beta < 1$) are used as shown by the following expressions 10 to 12.

$$Q_U = \beta \times R_U(T_U) \times i_u(t)^2 \qquad \text{[Expression 10]}$$

$$Q_V = \beta \times R_V(T_V) \times i_v(t)^2 \qquad \text{[Expression 11]}$$

$$Q_W = \beta \times R_W(T_W) \times i_w(t)^2 \qquad \text{[Expression 12]}$$

The motor currents $i_u$, $i_v$ and $i_w$ are motor currents in the system through which a current normally passes, and the gain $\beta$ is obtained by an experiment in advance. For example, at the normal time, a current is not made pass through one system but is made pass through only the other system, and the gain $\beta$ is set to a value by which a detected value and an estimated value of a temperature of a coil through which a current passes become the closest. It is possible to simply set $\beta = 0.5$ without the experiment.

The calorific values $Q_U$, $Q_V$ and $Q_W$ can be calculated in accordance with the following expressions 13 to 15 by substituting the expressions 4 to 6 for the expressions 10 to 12 respectively.

$$Q_U = \beta \times R_{U0} \times \{1 + \alpha_U \times (T_U - T_b)\} \times i_u(t)^2 \qquad \text{[Expression 13]}$$

$$Q_V = \beta \times R_{V0} \times \{1 + \alpha_V \times (T_V - T_b)\} \times i_v(t)^2 \qquad \text{[Expression 14]}$$

$$Q_W = \beta \times R_{W0} \times \{1 + \alpha_W \times (T_W - T_b)\} \times i_w(t)^2 \qquad \text{[Expression 15]}$$

At the abnormal time, the coil calorific value calculating sections 112, 113 and 114 calculate the calorific values $Q_U$, $Q_V$ and $Q_W$ by using the above expressions 13 to 15 respectively.

Though the substrate calorific value calculating section 115 also calculates a calorific value of the control substrate (a substrate calorific value) $Q_E$ from an expression of electric power occurring in a resistance, it obtains a magnitude of a current needed for the calculation by the motor currents $i_u$, $i_v$ and $i_w$. A calorific equivalent resistance of the control substrate (a substrate resistance) is changed depending on a temperature (a substrate temperature $T_E$ in the case of the control substrate) as with the coil resistance. Further, since the control substrate has heating corresponding to standby power such as feeble heating of a semiconductor switching element and heating caused by operations of a microcomputer or other semiconductors without a current passing through the coil in a state where an ignition is turned on, it is necessary to consider it in the calculation of the calorific value. Consequently, the calorific value $Q_E$ of the control substrate at the normal time is calculated in accordance with the following expression 16.

$$Q_E = R_E(T_E) \times (i_u(t)^2 + i_v(t)^2 + i_w(t)^2) + Q_{E0} \qquad \text{[Expression 16]}$$

Here, $R_E(T_E)$ is the substrate resistance, and $Q_{E0}$ a calorific value corresponding to standby power.

The calorific value of the control substrate (a corrected substrate calorific value) $Q_E$ at the abnormal time is calculated in accordance with the following expression 17 on the basis of calculation of multiplying the calorific value in the normal state by a gain.

$$Q_E = \beta \times R_E(T_E) \times (i_u(t)^2 + i_v(t)^2 + i_w(t)^2) + Q_{E0} \qquad \text{[Expression 17]}$$

The substrate resistance $R_E(T)$ in the case that the substrate temperature is T is calculated in accordance with the following expression 18 when the substrate resistance at the reference temperature $T_b$ is $R_{E0}$ and a temperature coefficient of the control substrate is $\alpha_E$, so that the calorific values $Q_E$ at the normal time and at the abnormal time can be respectively calculated in accordance with the following expressions 19 and 20 by substituting the expression 18 for the expressions 16 and 17.

$$R_E(T) = R_{E0} \times \{1 + \alpha_E \times (T - T_b)\} \qquad \text{[Expression 18]}$$

$$Q_E = R_{E0} \times \{1 \pm \alpha_E \times (T_E - T_b)\} \times (i_u(t)^2 + i_v(t)^2 + i_w(t)^2) + Q_{E0} \qquad \text{[Expression 19]}$$

$$Q_E = \beta \times R_{E0} \times \{1 + \alpha_E \times (T_E - T_b)\} \times (i_u(t)^2 + i_v(t)^2 + i_w(t)^2) + Q_{E0} \qquad \text{[Expression 20]}$$

The substrate calorific value calculating section 115 calculates the calorific value $Q_E$ by using the above expressions 19 and 20.

The coil temperature calculating section 116 calculates the coil temperatures $T_U$, $T_V$ and $T_W$ in respective phases based on a differential equation of heat conduction.

The differential equations of heat conduction with respect to the coils in the U-phase, the V-phase and the W-phase are the following expressions 21, 22 and 23 respectively.

$$C_L \frac{dT_U}{dt} = Q_U - K_L(T_U - T_0) - \\ K_{LL}(T_U - T_V) - K_{LL}(T_U - T_W) - K_{LE}(T_U - T_E)$$
[Expression 21]

$$C_L \frac{dT_V}{dt} = Q_V - K_L(T_V - T_0) - \\ K_{LL}(T_V - T_W) - K_{LL}(T_V - T_U) - K_{LE}(T_V - T_E)$$
[Expression 22]

$$C_L \frac{dT_W}{dt} = Q_W - K_L(T_W - T_0) - \\ K_{LL}(T_W - T_U) - K_{LL}(T_W - T_V) - K_{LE}(T_W - T_E)$$
[Expression 23]

Here, $C_L$ is a heat capacity of the coil, $K_L$ is a heat loss coefficient of the coil, $K_{LL}$ is a heat transfer coefficient between the coils, $K_{LE}$ is a heat transfer coefficient between the coil and the control substrate, and $T_0$ is an outside air temperature. Difference information of the fifth term of the right side in each of the above expressions 21 to 23 expresses the heat conduction between each phase and the control substrate.

The differential equation of heat conduction with respect to the control substrate is the following expression 24.

$$C_E \frac{dT_E}{dt} = Q_E - K_E(T_E - T_0) - \\ K_{LE}(T_E - T_U) - K_{LE}(T_E - T_V) - K_{LE}(T_E - T_W)$$
[Expression 24]

Here, $C_E$ is a heat capacity of the control substrate, and $K_E$ is a heat loss coefficient of the control substrate. Difference information from the third term to the fifth term of the right side in the above expression 24 expresses the heat conduction between each phase and the control substrate.

The following expressions 26 to 29 are obtained by arranging the above expression 21 to 24 and setting values as shown by the following expression 25.

$$\tau = \frac{C_L}{K_L + 2K_{LL} + K_{LE}}$$
[Expression 25]

$$\tau' = \frac{C_E}{K_E + 3K_{LE}}$$

$$\tau_{LL} = \frac{C_L}{K_{LL}}$$

$$\tau_{LE} = \frac{C_L}{K_{LE}}$$

$$\tau'_{LE} = \frac{C_E}{K_{LE}}$$

$$\tau_L = \frac{C_L}{K_L}$$

$$\frac{dT_U}{dt} = \frac{1}{C_L}Q_U - \frac{1}{\tau}T_U + \frac{1}{\tau_{LL}}T_V + \frac{1}{\tau_{LL}}T_W + \frac{1}{\tau_{LE}}T_E + \frac{1}{\tau_L}T_0$$
[Expression 26]

$$\frac{dT_V}{dt} = \frac{1}{C_L}Q_V - \frac{1}{\tau}T_V + \frac{1}{\tau_{LL}}T_W + \frac{1}{\tau_{LL}}T_U + \frac{1}{\tau_{LE}}T_E + \frac{1}{\tau_L}T_0$$
[Expression 27]

$$\frac{dT_W}{dt} = \frac{1}{C_L}Q_W - \frac{1}{\tau}T_W + \frac{1}{\tau_{LL}}T_U + \frac{1}{\tau_{LL}}T_V + \frac{1}{\tau_{LE}}T_E + \frac{1}{\tau_L}T_0$$
[Expression 28]

$$\frac{dT_E}{dt} = \frac{1}{C_E}Q_E + \frac{1}{\tau'_{LE}}T_U + \frac{1}{\tau'_{LE}}T_V + \frac{1}{\tau'_{LE}}T_W - \frac{1}{\tau'}T_E + \frac{1}{\tau'_E}T_0$$
[Expression 29]

The following expression 30 is obtained by transforming the above expression 29 and solving it for the outside air temperature $T_0$.

$$T_0 = \tau'_E \left\{ \frac{dT_E}{dt} - \frac{1}{\tau'_{LE}}(T_U + T_V - T_W) + \frac{1}{\tau'}T_E - \frac{1}{C_E}Q_E \right\}$$
[Expression 30]

Therefore, it is possible to obtain renewed coil temperatures $T_U$, $T_V$ and $T_W$ by obtaining the outside air temperature $T_0$ using the expression 30 by the substrate temperature $T_E$, the coil temperatures $T_U$, $T_V$ and $T_W$ and the substrate calorific value $Q_E$, obtaining differential values of the coil temperatures $T_U$, $T_V$ and $T_W$ using the expressions 26 to 28 by the outside air temperature $T_0$, the coil calorific values $Q_U$, $Q_V$ and $Q_W$, the coil temperatures $T_U$, $T_V$ and $T_W$ and the substrate temperature $T_E$, and integrating the differential values.

Figure 12:
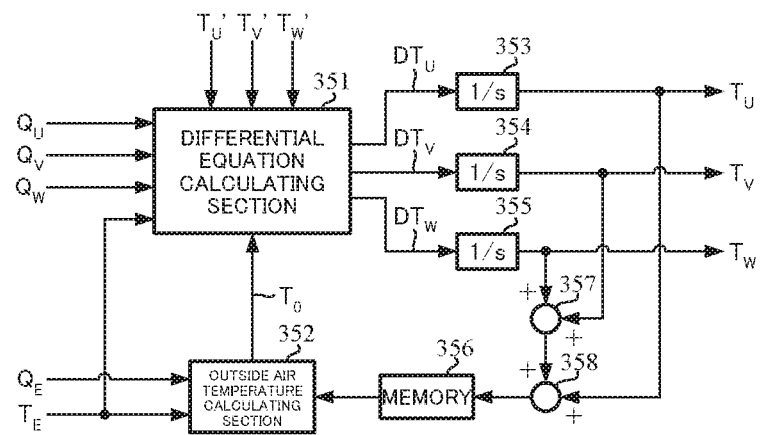
FIG. 12 is a block diagram showing a configuration example of a coil temperature calculating section.

The coil temperature calculating section 116 calculates the coil temperatures $T_U$, $T_V$ and $T_W$ in respective phases on the basis of the above expressions 26 to 28 and 30. A configuration example of the coil temperature calculating section 116 is shown in FIG. 12. The coil temperature calculating section 116 comprises a differential equation calculating section 351, an outside air temperature calculating section 352, an integrating sections 353, 354 and 355, a memory 356, and adding sections 357 and 358. The differential equation calculating section 351 calculates differential values $DT_U$, $DT_V$ and $DT_W$ of the coil temperatures $T_U$, $T_V$ and $T_W$ using the expressions 26 to 28 by the coil calorific values $Q_U$, $Q_V$ and $Q_W$, the substrate temperature $T_E$, previously estimated coil temperatures $T_U'$, $T_V'$ and $T_W'$ and the outside air temperature $T_O$ calculated at the outside air temperature calculating section 352. $C_L$, $\tau$, $\tau_{LL}$, $\tau_{LE}$ and $\tau_L$ in the expressions 26 to 28 are preset. The differential values $DT_U$, $DT_V$ and $DT_W$ are integrated at the integrating sections 353, 354 and 355 respectively, and the coil temperatures $T_U$, $T_V$ and $T_W$ are calculated. The integrals at the integrating sections 353, 354 and 355 are performed, for example, by accumulating the differential values to initial values of respective coil temperatures respectively. The coil temperatures $T_U$, $T_V$ and $T_W$ are outputted, at the same time, are added at the adding sections 357 and 358, and the addition result is retained in the memory 356. The outside air temperature calculating section 352 inputs the substrate calorific value $Q_E$ and the substrate temperature $T_E$ with the addition result $(T_U+T_V+T_W)$ retained in the memory 356, and calculates the outside air temperature $T_O$ using the expression 30. $C_E$, $\tau'$, $\tau_{LE}'$ and $\tau_E'$ in the expression 30 are preset.

The coil temperatures $T_U$, $T_V$ and $T_W$ calculated at the coil temperature calculating section 116 are inputted into the overheat processing section 120, and at the same time, are respectively retained in the memories 117, 118 and 119 in order to be used in next calculations of the coil calorific values and next calculations of the coil temperatures.

The overheat processing section 120 performs, for example, processing at an abnormality judging section 25 and a motor current limiting section 23 described in a publication of Japanese Patent No. 4356295 B2. That is, as with the processing at the abnormality judging section 25, the overheat processing section 120 judges whether the coil temperatures $T_U$, $T_V$ and $T_W$ exceed a predetermined tolerance limit temperature of the three-phase motor 200 or not, and judges that the three-phase motor 200 is overheated when they exceed it. When judging the overheating state, the overheat processing section 120 gradually decreases the current command value with the elapse of time and gradually decreases the motor current with the elapse of time as with the processing at the motor current limiting section 23, or sets the current command value to zero and cuts off the motor current. It is possible to mount a temperature detecting circuit 31 and a temperature detecting section 26 described in the same publication and judge an abnormality of the temperature detecting circuit 31.

In such a configuration, an operating example will be described.

As the operation starts, the motor rotational angle detecting circuit 101 detects the motor rotational angle θe of the three-phase motor 200, and outputs it to the motor angular velocity calculating section 102 and the current control sections 160A and 160B.

The motor angular velocity calculating section 102 calculates the motor angular velocity ωe by means of the motor rotational angle θe, and outputs it to the current control sections 160A and 160B.

Figure 13:
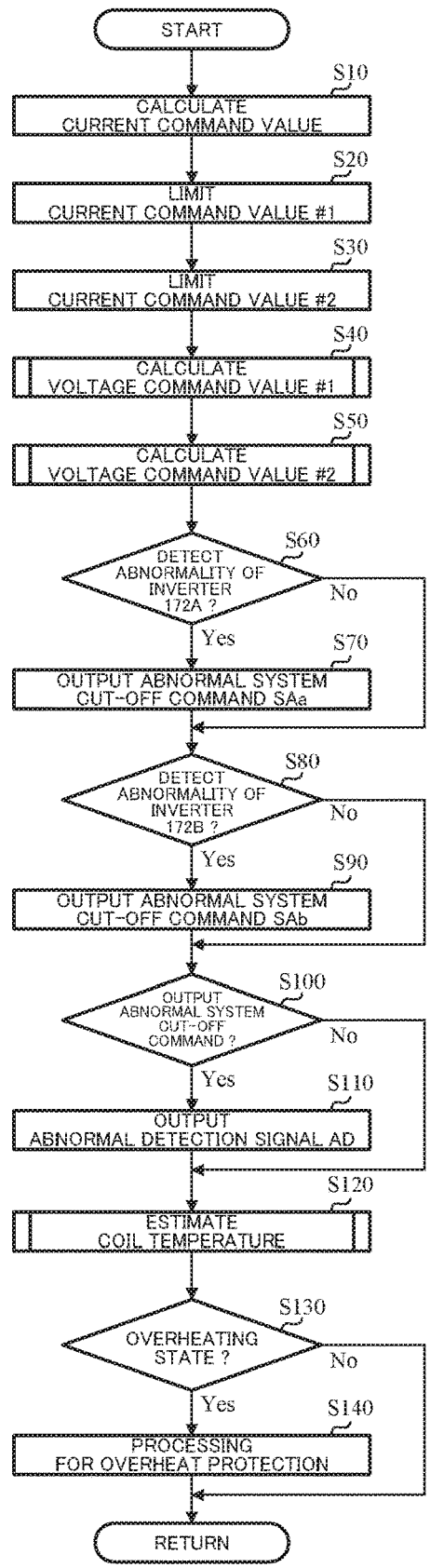
FIG. 13 is a flowchart showing a part of an operating example of the present invention.
Figure 14:
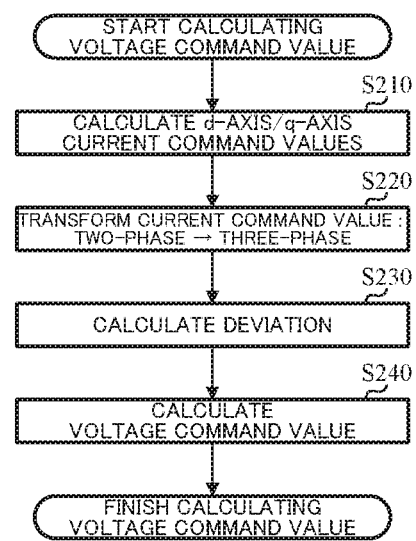
FIG. 14 is a flowchart showing an operating example of calculation of a voltage command value.

An operating example from the current command value calculating section 130 to the overheat processing section 120 will be described with reference to flowcharts in FIGS. 13 to 15.

The current command value calculating section 130 inputs the steering torque Th detected by the torque sensor 10 and the vehicle speed Vel detected by the vehicle speed sensor 12, calculates the current command value by using the assist map, halves it, and outputs the halved current command value to the current limiting sections 150A and 150B as the current command values I1* and I2* respectively (Step S10).

The current limiting sections 150A inputs the current command value I1*, outputs a predetermined value as the current command value I1m* when the current command value I1* exceeds the predetermined value, and outputs the current command value I1* as the current command value I1m* when the current command value I1* does not exceed the predetermined value (Step S20). Similarly, the current limiting section 150B inputs the current command value I2*, and obtains and outputs the current command value I2m* (Step S30).

The current control section 160A calculates the three-phase voltage command value on the basis of the current command value I1m*, the three-phase motor current, the motor rotational angle θe and the motor angular velocity ωe (Step S40).

The current command value I1m* and the motor angular velocity ωe are inputted into the dq-axis current command value calculating section 161A, the motor rotational angle θe is inputted into the two-phase/three-phase transforming section 162A, and the three-phase motor current ($i1_u$, $i1_v$ and $i1_w$) is subtraction-inputted into the subtracting sections 166A, 167A and 168A respectively. The dq-axis current command value calculating section 161A calculates the d-axis current command value Id1* and the q-axis current command value Iq1* on the basis of the current command value I1m* and the motor angular velocity ωe (Step S210), and outputs them to the two-phase/three-phase transforming section 162A. The two-phase/three-phase transforming section 162A transforms the d-axis current command value Id1* and the q-axis current command value Iq1* into the U-phase current command value I1u*, the V-phase current command value I1v* and the W-phase current command value I1w* by using the motor rotational angle θe (Step S220). The U-phase current command value I1u*, the V-phase current command value I1v* and the W-phase current command value I1w* are outputted to the abnormality detecting section 140, and at the same time, are addition-inputted into the subtracting sections 166A, 167A and 168A respectively. The deviation ΔIu between the U-phase current command value I1u* and the motor current $i1_1$ is calculated at the subtracting section 166A, the deviation ΔIv between the V-phase current command value I1v* and the motor current $i1_v$ is calculated at the subtracting section 167A, and the deviation ΔIw between the W-phase current command value I1w* and the motor current $i1_w$ is calculated at the subtracting section 168A (Step S230). The PI-control section 163A inputs the deviation ΔIu, and calculates the U-phase voltage command value V1u* by PI-control calculation. The PI-control section 164A inputs the deviation ΔIv, and calculates the V-phase voltage command value V1v* by PI-control calculation. The PI-control section 165A inputs the deviation ΔIw, and calculates the W-phase voltage command value V1w* by PI-control calculation (Step S240). The three-phase voltage command value (V1u*, V1v* and V1w*) is outputted to the motor driving section 170A.

According to the same operation as the current control section 160A, the current control section 160B also calculates the three-phase current command value (I2u*, I2v* and I2w*) and the three-phase voltage command value (V2u*, V2v* and V2w*) on the basis of the current command value I2m*, the three-phase motor current ($i2_u$, $i2_v$ and $i2_w$), the motor rotational angle θe, and the motor angular velocity ωe (Step S50), the three-phase current command value (I2u*, I2v* and I2w*) is outputted to the abnormality detecting section 140, and the three-phase voltage command value (V2u*, V2v* and V2w*) is outputted to the motor driving section 170B.

The abnormality detecting section 140 inputting the three-phase current command values (I1u*, I1v* and I1w*, and I2u*, I2v* and I2w*) inputs also the detected motor current values I1ud, I1vd and I1wd that are detected by the abnormality detecting circuit 181A, and the detected motor current values I2ud, I2vd and I2wd that are detected by the abnormality detecting circuit 181B, and detects the open failure or the short failure of the FETs constituting the inverters 172A and 172B. When the abnormality detecting section 140 detects the abnormality by comparing the detected motor current values I1ud, I1vd and I1wd with the three-phase current command value (I1u*, I1v* and I1w*) (Step S60), the abnormality detecting section 140 outputs the abnormal system cut-off command SAa to the motor driving section 170A (Step S70). When the abnormality detecting section 140 detects the abnormality by comparing the detected motor current values I2ud, I2vd and I2wd with the three-phase current command value (I2u*, I2v* and I2w*) (Step S80), the abnormality detecting section 140 outputs the abnormal system cut-off command SAb to the motor driving section 170B (Step S90). Further, when the abnormality detecting section 140 has outputted the abnormal system cut-off command(s) SAa and/or SAb (Step S100), that is, has detected the abnormality in both or either of the inverters 172A and 172B, the abnormality detecting section 140 outputs the abnormal detection signal AD to the coil temperature estimating section 110 (Step S110). At this time, the abnormality detecting section 140 sets the abnormal detection signal AD to "1" when detecting the abnormality in only the inverter 172A, sets the abnormal detection signal AD to "2" when detecting the abnormality in only the inverter 172B, and sets the abnormal detection signal AD to "3" when detecting the abnormality in both of the inverters 172A and 172B.

The coil temperature estimating section 110 estimates the coil temperatures $T_u$, $T_v$ and $T_w$ of respective phases on the basis of the substrate temperature $T_E$ detected by the temperature sensor 105, the three-phase motor current and the abnormal detection signal AD (Step S120).

When not inputting the abnormal detection signal AD (Step S310), the switching section 111 in the coil temperature estimating section 110 outputs the three-phase motor current (the U-phase motor current i1$_u$, the V-phase motor current i1$_v$ and the W-phase motor current i1$_w$) from the motor driving section 170A as the U-phase motor current i$_u$, the V-phase motor current i$_v$ and the W-phase motor current i$_w$ respectively (Step S320). When inputting the abnormal detection signal AD (Step S310), the switching section 111 confirms a value of the abnormal detection signal AD (Step S330). When the value of the abnormal detection signal AD is "1", the switching section 111 judges that the abnormality has occurred in the first system, and outputs the three-phase motor current (the U-phase motor current i2$_u$, the V-phase motor current i2$_v$ and the W-phase motor current i2$_w$) from the motor driving section 170B as the U-phase motor current i$_u$, the V-phase motor current i$_v$ and the W-phase motor current i$_w$ respectively (Step S340). When the value of the abnormal detection signal AD is "2", the switching section 111 judges that the abnormality has occurred in the second system, and outputs the three-phase motor current from the motor driving section 170A as the U-phase motor current i$_u$, the V-phase motor current i$_v$ and the W-phase motor current i$_w$ respectively (Step S350). When the value of the abnormal detection signal AD is "3", the switching section 111 judges that the abnormality has occurred in both the first system and the second system, gives warning (Step S360), and does not output the motor current.

The U-phase motor current i$_u$, the V-phase motor current i$_v$ and the W-phase motor current i$_w$ are inputted into the coil calorific value calculating sections 112, 113 and 114 respectively, and at the same time, are inputted into the substrate calorific value calculating section 115. The temperature sensor 105 detects the temperature of the control substrate (Step S370), and outputs the substrate temperature $T_E$ to the substrate calorific value calculating section 115 and the coil temperature calculating section 116.

The coil calorific value calculating sections 112 calculates the coil calorific value $Q_u$ in the U-phase by using the U-phase motor currents i$_u$ and the previously estimated coil temperature $T_U'$ retained in the memory 117 in accordance with the expression 7 in the case of not inputting the abnormal detection signal AD or the expression 13 in the case of inputting it (Step S380). Similarly, the coil calorific value calculating sections 113 calculates the coil calorific value $Q_V$ in the V-phase by using the V-phase motor currents i$_v$ and the coil temperature $T_V'$ retained in the memory 118 in accordance with the expression 8 in the case of not inputting the abnormal detection signal AD or the expression 14 in the case of inputting it (Step S390), and the coil calorific value calculating sections 114 calculates the coil calorific value $Q_W$ in the W-phase by using the W-phase motor currents i$_w$ and the coil temperature $T_W'$ retained in the memory 119 in accordance with the expression 9 in the case of not inputting the abnormal detection signal AD or the expression 15 in the case of inputting it (Step S400). The reference temperature $T_b$, the coil resistances $R_{U0}$, $R_{V0}$ and $R_{W0}$ at the reference temperature $T_b$ and the temperature coefficients $\alpha_U$, $\alpha_V$ and $\alpha_W$ are preset.

The substrate calorific value calculating section 115 calculates the substrate calorific value $Q_E$ by using the inputted motor current (i$_u$, i$_v$ and i$_w$) and the substrate temperature $T_E$ in accordance with the expression 19 in the case of not inputting the abnormal detection signal AD or the expression 20 in the case of inputting it (Step S410). The reference temperature $T_b$, the substrate resistance $R_{E0}$ at the reference temperature $T_b$, the temperature coefficient $\alpha_E$ and the calorific value $Q_{E0}$ are preset.

The calorific values $Q_U$, $Q_V$, $Q_W$ and $Q_E$ are inputted into the coil temperature calculating section 116 with the substrate temperature $T_E$ and the coil temperatures $T_u'$, $T_v'$ and $T_w'$ retained in the memories 117, 118 and 119.

The outside air temperature calculating section 352 in the coil temperature calculating section 116 inputs the addition result ($T_U + T_V + T_W$) retained in the memory 356 with the calorific value QE and the substrate temperature $T_E$, calculates the outside air temperature $T_0$ in accordance with the expression 30 (Step S420), and outputs it to the differential equation calculating section 351. The differential equation calculating section 351 calculates the differential values $DT_U$, $DT_V$ and $DT_W$ of the coil temperatures by the coil calorific values $Q_U$, $Q_V$ and $Q_W$, the substrate temperature $T_E$, the outside air temperature $T_0$ and the coil temperatures $T_U'$, $T_V'$ and $T_W'$ in accordance with the expressions 26 to 28 (Step S430). The integrating sections 353, 354 and 355 input the differential values $DT_U$, $DT_V$ and $DT_W$ respectively, integrate them, and calculate the coil temperatures $T_U$, $T_V$ and $T_W$ (Step S440). The coil temperatures $T_U$, $T_V$ and $T_W$ are outputted, and at the same time, are added at the adding sections 357 and 358. The addition result ($T_U + T_V + T_W$) is retained in the memory 356 for the next calculation of the outside air temperature (Step S450).

The coil temperatures $T_U$, $T_V$ and $T_W$ outputted from the coil temperature calculating section 116 are inputted into the overheat processing section 120, and at the same time, are respectively retained in the memories 117, 118 and 119 (Step S460).

The overheat processing section 120 judges whether the state is the overheating state or not by the coil temperatures $T_U$, $T_V$ and $T_W$ (Step S130), and performs processing for overheat protection when judging the overheating state (Step S140).

In the motor driving section 170A, the three-phase voltage command value (V1u*, V1v* and V1w*) is inputted into the gate driving circuit 173A, and the abnormal system cut-off command SAa is also inputted into the gate driving circuit 173A when the abnormality detecting section 140 has outputted the abnormal system cut-off command SAa. When the three-phase voltage command value is inputted, the gate driving circuit 173A generates the six PWM-signals on the basis of the three-phase voltage command value and the carrier signal of the triangular wave, and outputs the PWM-signals to the inverter 172A. Further, when the abnormal system cut-off command SAa is not inputted, the gate driving circuit 173A outputs the gate signals of high level to the motor current cut-off circuit 180A and the power source cut-off circuit 174A. Herewith, the FETs QA1, QA2 and QA3 of the motor current cut-off circuit 180A become an on-state, conduction becomes possible between the inverter 172A and the first motor winding L1 of the three-phase motor 200, moreover, the FETs QC1 and QC2 of the power source cut-off circuit 174A become an on-state, and a direct current from the battery 103 is supplied to the inverter 172A through the noise filter 104. Therefore, the PWM-signals outputted from the gate driving circuit 173A are inputted into the gates of the FETs Q1 to Q6 of the inverter 172A, and the U-phase current I1u, the V-phase current I1v and the W-phase current I1w are inputted from the connection between the FETs of each of the switching-arms SAu, SAv and SAw into the first motor winding L1 of the three-phase motor 200. When the abnormal system cut-off command SAa has been inputted, the gate driving circuit 173A outputs the gate signals of low level to the motor current cut-off circuit 180A and the power source cut-off circuit 174A. Herewith, the FETs QA1, QA2 and QA3 of the motor current cut-off circuit 180A become an off-state, the conduction to the first motor winding L1 of the three-phase motor 200 is cut off, moreover, the FETs QC1 and QC2 of the power source cut-off circuit 174A become an off-state, and supply of the direct current from the battery 103 to the inverter 172A is cut off.

According to the same operation as the motor driving section 170A, the current of each phase inputted into the second motor winding L2 of the three-phase motor 200 is controlled in the motor driving section 170B.

Moreover, the operations of the first system and the second system may interchange in order, or may be performed in parallel. Though the two-phase/three-phase transforming section calculates the three-phase current command value individually, it is possible to calculate the current command value of one phase on the basis of a total value of the current command values of the other two phases. This enables reduction of an operation amount. Further, when the abnormality occurs, it is possible to adjust the current command value calculated at the current command value calculating section 130 in order to suppress a rapid change of an assist torque caused by the cutoff of the motor current.

In the above embodiment, though the coil temperature calculating section 116 retains the addition result of the coil temperatures $T_U$, $T_V$ and $T_W$ in the memory 356, it is possible to use an addition result of the coil temperatures $T_U'$, $T_V'$ and $T_W'$ respectively retained in the memories 117, 118 and 119 when the outside air temperature calculating section 352 calculates the outside air temperature $T_O$. Though the coil temperature calculating section 116 calculates the coil temperature based on the differential equation, it is also possible to calculate it after transforming the differential equation into a difference equation that is generally used and is capable of being mounted in the ECU, or to calculate it after transforming the differential equation into a transfer function. Though the above embodiment targets the three-phase motor, the present invention can be applied to a motor where the number of phases is other than three. The number of systems is not also limited to two, and the present invention can be applied to a motor consisting of more than three systems. In the case of more than three systems, the gain β used to calculate the calorific value when the abnormality occurs, is adjusted in accordance with the number of normal systems.

Though the current control section performs the two-phase/three-phase transformation from the dq-rotary coordinate system to the UVW-fixed coordinate system with respect to the current command value, the current control section may perform it with respect to the voltage command value. In this case, a three-phase/two-phase transforming section is needed that transforms the three-phase motor current fed back from the motor driving section and the three-phase detected motor current value detected by the abnormality detecting circuit into two-phase currents in the dq-rotary coordinate system respectively, and the abnormality detecting section detects the abnormality by comparing the two-phase detected motor current value with the two-phase current command value. Further, though the above embodiment deals with the failure of the inverter in the motor driving section as the detected failure, the present invention can be applied to the case where the motor winding fails. Furthermore, though the star-connection is used as the method of connecting the coils, a delta-connection may be used.

EXPLANATION OF REFERENCE NUMERALS 1 steering wheel
2 column shaft (steering shaft, handle shaft)
10 torque sensor
12 vehicle speed sensor
13, 103 battery
14 steering angle sensor
20 motor
21 rotational angle sensor
30 control unit (ECU)
31, 130 current command value calculating section
33, 150A, 150B current limiting section
35, 163A, 164A, 165A PI-control section
PWM-control section
37, 172A, 172B inverter
101 motor rotational angle detecting circuit
102 motor angular velocity calculating section
104 noise filter
105 temperature sensor
110 coil temperature estimating section
111 switching section
112, 113, 114 coil calorific value calculating section
115 substrate calorific value calculating section 116 coil temperature calculating section
120 overheat processing section
140 abnormality detecting section
160A, 160B current control section
161A dq-axis current command value calculating section
162A two-phase/three-phase transforming section
170A, 170B motor driving section
171A, 171B current detecting circuit
173A, 173B gate driving circuit
174A, 174B power source cut-off circuit
180A, 180B motor current cut-off circuit
181A, 181B abnormality detecting circuit
200 three-phase motor (two-system winding motor)
351 differential equation calculating section
352 outside air temperature calculating section

The invention claimed is:

1. An electric power steering apparatus that comprises a control substrate that controls a poly-phase motor having a multi-system motor winding, comprising:
    a temperature sensor that detects a substrate temperature of said control substrate;
    and a coil temperature estimating section that obtains coil calorific values of respective phases of said poly-phase motor and a substrate calorific value of said control substrate by a motor current of said phase, and estimates a coil temperature of said phase by said coil calorific value, said substrate calorific value and said substrate temperature based on a heat transfer phenomenon between said respective phases that is caused by a difference in temperature between coils of said respective phases and a heat transfer phenomenon between said coil and said control substrate;
    wherein said coil temperature estimating section estimates said coil temperature by a corrected coil calorific value and a corrected substrate calorific value that are obtained by correcting said coil calorific value and said substrate calorific value that are obtained in a normal system and said substrate temperature, when an abnormality occurs in any of systems;
    and wherein said heat transfer phenomenon is expressed by a differential equation.

2. The electric power steering apparatus according to claim 1,
    wherein said coil temperature estimating section obtains said corrected coil calorific value and said corrected substrate calorific value by multiplying said coil calorific value and said substrate calorific value by a gain.

3. The electric power steering apparatus according to claim 1,
    wherein said coil temperature estimating section comprises:
    a coil calorific value calculating section that obtains said coil calorific value and said corrected coil calorific value by said motor current of said phase;
    a substrate calorific value calculating section that obtains said substrate calorific value and said corrected substrate calorific value by said motor current; and
    a coil temperature calculating section that obtains said coil temperature by said coil calorific value and said substrate calorific value, or said corrected coil calorific value and said corrected substrate calorific value, and said substrate temperature, based on said differential equation.

4. The electric power steering apparatus according to claim 2,
    wherein said coil temperature estimating section comprises:
    a coil calorific value calculating section that obtains said coil calorific value and said corrected coil calorific value by said motor current of said phase;
    a substrate calorific value calculating section that obtains said substrate calorific value and said corrected substrate calorific value by said motor current; and
    a coil temperature calculating section that obtains said coil temperature by said coil calorific value and said substrate calorific value, or said corrected coil calorific value and said corrected substrate calorific value, and said substrate temperature, based on said differential equation.

5. The electric power steering apparatus according to claim 3,
    wherein coil calorific value calculating section changes a coil resistance of said phase used to obtain said coil calorific value, depending on said coil temperature of a corresponding phase; and
    wherein said substrate calorific value calculating section changes a substrate resistance used to obtain said substrate calorific value, depending on said substrate temperature.

6. The electric power steering apparatus according to claim 4,
    wherein coil calorific value calculating section changes a coil resistance of said phase used to obtain said coil calorific value, depending on said coil temperature of a corresponding phase; and
    wherein said substrate calorific value calculating section changes a substrate resistance used to obtain said substrate calorific value, depending on said substrate temperature.

7. The electric power steering apparatus according to claim 1,
    wherein said differential equation includes difference information between said coil temperature and said substrate temperature.

8. The electric power steering apparatus according to claim 2,
    wherein said differential equation includes difference information between said coil temperature and said substrate temperature.

9. The electric power steering apparatus according to claim 3,
    wherein said differential equation includes difference information between said coil temperature and said substrate temperature.

10. The electric power steering apparatus according to claim 4,
    wherein said differential equation includes difference information between said coil temperature and said substrate temperature.

11. The electric power steering apparatus according to claim 5,
    wherein said differential equation includes difference information between said coil temperature and said substrate temperature.

12. The electric power steering apparatus according to claim 6,
    wherein said differential equation includes difference information between said coil temperature and said substrate temperature.

* * * * *